United States Patent
Takemori et al.

(10) Patent No.: US 7,312,908 B2
(45) Date of Patent: Dec. 25, 2007

(54) 3D IMAGE DISPLAY AND 3D IMAGE DISPLAY METHOD

(75) Inventors: Tamiki Takemori, Hamamatsu (JP); Takahiro Ikeda, Cambridge, MA (US)

(73) Assignee: Hamamatsu Photonics K.K., Shizuoka (JP)

( * ) Notice: Subject to any disclaimer, the term of this patent is extended or adjusted under 35 U.S.C. 154(b) by 296 days.

(21) Appl. No.: 10/527,448

(22) PCT Filed: Sep. 11, 2003

(86) PCT No.: PCT/JP03/11625
§ 371 (c)(1),
(2), (4) Date: Mar. 11, 2005

(87) PCT Pub. No.: WO2004/025380
PCT Pub. Date: Mar. 25, 2004

(65) Prior Publication Data
US 2006/0033972 A1    Feb. 16, 2006

(30) Foreign Application Priority Data
Sep. 11, 2002 (JP) ............................. 2002-265935

(51) Int. Cl.
*G03H 1/22* (2006.01)
(52) U.S. Cl. .................. 359/32; 359/9; 359/22
(58) Field of Classification Search ............ 359/9–11, 359/22, 15, 32, 33, 29; 348/40, 41
See application file for complete search history.

(56) References Cited
U.S. PATENT DOCUMENTS
4,067,638 A * 1/1978 Yano et al. ................ 359/9
6,317,228 B2 * 11/2001 Popovich et al. ........... 359/15

FOREIGN PATENT DOCUMENTS
JP    09-258643    10/1997
JP    2000-250387    * 9/2000

OTHER PUBLICATIONS

K. Takano et al., 3D Image Conference 2000; "Examination about Color Holography Three Dimensional Television Using White Light Source"; *Shonan Institute of Technology*; pp. 179-182, including English language Abstract.

* cited by examiner

Primary Examiner—Leonidas Boutsikaris
(74) Attorney, Agent, or Firm—Drinker Biddle & Reath LLP

(57) ABSTRACT

A small, inexpensive three-dimensional image display having a structure for displaying a color three-dimensional image sharply even if a low-resolution spatial optical modulating element is used. The three-dimensional image display has an illumination light source unit, a transmission spatial optical modulating element, a lens, and a mask. The illumination light source unit includes three point light sources outputting illumination light components having wavelengths (red, green, blue) different from one another. The point light source outputting the blue illumination light component of the shortest wavelength is disposed in position $B(0, 0)$ on the optical axis of an illumination optical system, the point light source outputting the red illumination light component is disposed in position $R(x_r, 0)$, and the point light source outputting the green illumination light component is disposed in position $G(x_g, 0)$. An aperture section of the mask is disposed in the region where the zero-order diffracted waves of the reproduction light components of the three wavelengths after subjected to wavefront conversion by the lens are superposed on one another. The illumination optical system determines the direction of incidence of each of the illumination optical components of the three wavelengths on the spatial optical modulation element.

20 Claims, 22 Drawing Sheets

3D IMAGE DISPLAY AND 3D IMAGE DISPLAY METHOD

TECHNICAL FIELD

The present invention relates to an apparatus and a method for making illumination light components of multiple wavelengths incident to a hologram, thereby generating reproduced light components of the wavelengths from the hologram, and displaying a 3D image based on these reproduced light components.

BACKGROUND ART

A 3D image display apparatus making use of a hologram is configured to generate a reproduced light component from a hologram under illumination with an illumination light component and to display a 3D image from the reproduced light component thus generated. Another 3D image display apparatus is configured to make illumination light components of multiple wavelengths (e.g., three-color components of red, green, and blue) incident to a hologram, thereby enabling color display of a 3D image.

A first conventional technology known heretofore is a technology of making use of a photographic plate permitting high-resolution recording. In this first conventional technology, hologram recording is carried out by making reference light components and object light components of respective wavelengths incident to a photographic plate and thereby multiply recording holograms associated with the respective wavelengths on the photographic plate. On the other hand, reproduction is implemented by making illumination light components of the same wavelengths as those in the recording, incident from an identical incident direction to the holograms to generate reproduced light components of the wavelengths. This results in superimposing images of these reproduced light components on each other at the same position, thereby obtaining a color 3D image.

However, since in this first conventional technology the holograms associated with the respective wavelengths are multiply recorded on the photographic plate, the illumination light component of a wavelength $\lambda_a$ is incident to the hologram associated with the wavelength $\lambda_a$ to generate the reproduced light component of the wavelength $\lambda_a$, and the illumination light component of another wavelength $\lambda_b$ ($\lambda_a \neq \lambda_b$) is also incident to the hologram associated with the wavelength $\lambda_a$ to generate a reproduced light component of the wavelength $\lambda_b$ from the hologram associated with the wavelength $\lambda_a$ as well. Among these reproduced light component of wavelength $\lambda_a$ and reproduced light component of wavelength $\lambda_b$, the reproduced light component of wavelength $\lambda_a$ is the light component necessary for color display of the original 3D image. In contrast to it, the reproduced light component of wavelength $\lambda_b$ is a light component reproduced at a different position and at a different magnification from those of the original 3D image, and is thus a crosstalk component against the original 3D image to hider display of the 3D image. In order to avoid such crosstalk, therefore, recording is carried out by making the reference light components of multiple wavelengths incident from mutually different directions to the photographic plate where the object light components are incident approximately normally to the photographic plate, whereby crosstalk light components are prevented from being superimposed on the original 3D image in the reproduction.

As a second conventional technology, Kunihiko Takano et al. "Study of color holography 3D television with white light," Proceedings of 3D Image Conference 2000, pp179–182 discloses a technology of making use of three types of spatial light modulators capable of presenting a hologram. Specifically, a first spatial light modulator presents a hologram associated with red light, a second spatial light modulator a hologram associated with green light, and a third spatial light modulator a hologram associated with blue light. Then a red illumination light component is made incident to the first spatial light modulator, a green illumination light component to the second spatial light modulator, and a blue illumination light component to the third spatial light modulator, whereby reproduced light components generated from the respective spatial light modulators are spatially superimposed, and zero-order transmitted light is removed by a mask disposed in a subsequent stage, thereby obtaining a color 3D image.

Furthermore, a third conventional technology is the technology described in Japanese Patent Application Laid-Open No. 2000-250387, which positively makes use of the pixel structure of the spatial light modulator being discrete. Specifically, when parallel light is made incident into an ordinary diffraction grating, there appear not only a zero-order diffracted wave but also first and higher-order diffracted waves. Likewise, reproduced light components generated from a spatial light modulator having the discrete pixel structure also include a zero-order diffracted wave and higher-order diffracted waves. Concerning two adjacent pixels in a spatial light modulator, where a presentation range is limited to a range in which phase differences between synthetic wavefronts of an object light component and a reference light component are less than n (i.e., a range without alias components) and where a hologram is presented on the spatial light modulator, wavefronts of higher-order diffracted waves of reproduced light components generated from the spatial light modulator upon incidence of the illumination light component coincide with those of the zero-order diffracted waves. However, directions of emergence from the spatial light modulator are different among orders. The reproduced light components undergo wavefront transformation to be separated at intervals of $\lambda f/P$ in each order of the diffracted waves on the rear focal plane of a lens provided behind the spatial light modulator. Here $\lambda$ is the wavelength of the illumination light component, f the focal length of the lens, and P the pixel pitch of the spatial light modulator. Therefore, a desired 3D image is obtained in a manner of disposing a mask with an aperture of rectangular shape having the length of $\lambda f/P$ on each side on the rear focal plane of the lens and letting the zero-order diffracted wave of the reproduced light components pass through this aperture. The higher-order diffracted waves are blocked by this mask on the other hand.

In the above third conventional technology, concerning two adjacent pixels in the spatial light modulator, where the presentation range is limited to a range in which phase differences between synthetic wavefronts of an object light component and a reference light component are not less than $\pi$ and are less than $2\pi$ (i.e., a range including a first-order alias component) and where a hologram is presented on the spatial light modulator, the wavefronts of the higher-order diffracted waves of the reproduced light components generated from the spatial light modulator upon incidence of the illumination light component coincide with the zero-order diffracted wave. For this reason, the zero-order diffracted wave and all the higher-order diffracted waves include their first-order alias component. Only a desired first-order diffracted wave among the reproduced light components can be extracted in a manner of disposing a mask with an aperture of rectangular shape having the length of λf/P on each side on the rear focal plane of the lens disposed behind the spatial light modulator and letting the first-order diffracted wave of the reproduced light components pass through this aperture. The zero-order diffracted wave and the second and higher-order diffracted waves are blocked by the mask on the other hand.

Namely, the above third conventional technology is to present the hologram on the spatial light modulator while limiting the presentation range to the range including the alias component of a specific order and to extract the diffracted wave of the specific order out of the reproduced light components by use of the mask with the aperture at the position corresponding to the specific order. The presentation of the hologram and the selection of the aperture associated with each order are implemented based on time-sharing or spatial synthesis, thereby enabling expansion of the emergence direction range of the reproduced image (i.e., a viewing area) formed by the lens.

DISCLOSURE OF THE INVENTION

Inventors studied each of the aforementioned first to third conventional technologies and found the following problems. Namely, the first conventional technology is suitable for cases making use of the photographic plate capable of high-resolution recording. With use of a spatial light modulator having a low spatial resolution, however, it does not allow setting of a large angle of incidence of the illumination light component to the spatial light modulator, so that the reproduced light components serving as crosstalk upon reproduction are superimposed on the original 3D image. As discussed in the description of the third conventional technology, there occurs superposition of diffracted waves of respective orders generated from the spatial light modulator having the discrete pixel structure. In this respect, it is difficult to apply the foregoing first conventional technology to the spatial light modulator having the discrete pixel structure and low resolution.

The second conventional technology involves the spatial superposition of reproduced light components generated from the respective spatial light modulators, but requires a half mirror for the superposition. For this reason, the second conventional technology brings about an increase in the scale of apparatus and a reduction in the light quantity of the reproduced light components. In order to compensate for the reduction in the light quantity of the reproduced light components, the second conventional technology requires laser light sources for outputting laser light of high power as the illumination light components, or a dielectric mirror having wavelength selectivity, which makes the apparatus itself expensive.

The third conventional technology is directed toward the objective of expansion of the viewing area and the illumination light component of a single wavelength is made incident normally to the spatial light modulator. Therefore, this third conventional technology is neither a technology of making illumination light components of multiple wavelengths incident to a spatial light modulator, nor a technology of making an illumination light component obliquely incident to the spatial light modulator. The third conventional technology has a problem of increase in the scale of the apparatus itself due to the spatial synthesis and a problem of increase in the cost of the apparatus itself due to the necessity for provision of a high-speed shutter on the rear focal plane of the lens for time-sharing.

The present invention has been accomplished in order to solve the problems as described above, and an object of the invention is to provide a compact and inexpensive 3D image display apparatus and a 3D image display method capable of presenting color display of a clear 3D image even with use of a spatial light modulator of a low resolution.

A 3D image display apparatus according to the present invention is an apparatus for making illumination light components of multiple wavelengths incident to a hologram, thereby generating reproduced light components of the wavelengths from the hologram, and displaying a 3D image based on these reproduced light components. Specifically, the 3D image display apparatus according to the present invention comprises a spatial light modulator, an illumination optical system, a reproduced image transforming optical system, and a mask. The spatial light modulator has a discrete pixel structure to present holograms associated with the respective wavelengths. The illumination optical system converts each of the illumination light components of the wavelengths into a parallel plane wave, and makes the parallel plane waves incident from mutually different incident directions to the spatial light modulator. The reproduced image transforming optical system subjects each of reproduced images of the wavelengths generated from the holograms presented on the spatial light modulator, to wavefront transformation into a virtual image or a real image. The mask has an aperture provided on a focal plane of the reproduced image transforming optical system. Particularly, in the 3D image display apparatus according to the present invention, the illumination optical system sets the incident directions of the respective illumination light components of the wavelengths to the spatial light modulator so that diffracted waves of any order out of the reproduced light components of the wavelengths are superimposed on each other in the aperture after the wavefront transformation by the reproduced image transforming optical system.

A 3D image display method according to the present invention is a method of making illumination light components of multiple wavelengths incident to a hologram, thereby generating reproduced light components of the wavelengths from the hologram, and displaying a 3D image based on these reproduced light components. Specifically, the method comprises preparing a spatial light modulator having a discrete pixel structure for presenting holograms associated with the respective wavelengths, letting an illumination optical system convert each of the illumination light components of the wavelengths into a parallel plane wave and make the parallel plane waves incident from mutually different incident directions to the spatial light modulator, letting a reproduced image transforming optical system subject each of reproduced images of the wavelengths generated from the holograms presented on the spatial light modulator, to wavefront transformation into a virtual image or a real image, placing a mask with an aperture on a focal plane of the reproduced image transforming optical system, and letting the illumination optical system set the incident directions of the respective illumination light components of the wavelengths to the spatial light modulator so that diffracted waves of any order out of the reproduced light components of the wavelengths are superimposed on each other in the aperture after the wavefront transformation by the reproduced image transforming optical system.

According to the present invention, the holograms associated with the respective wavelengths are presented on the spatial light modulator having the discrete pixel structure. The illumination optical system converts each of the illumination light components of the wavelengths into a parallel plane wave and makes the parallel plane waves incident from the mutually different incident directions to this spatial light modulator. Each of the reproduced images of the wavelengths generated from the holograms presented on the spatial light modulator is subjected to the wavefront transformation by the reproduced image transforming optical system into a virtual image or a real image. The mask with the aperture is disposed on the focal plane of the reproduced image transforming optical system. Then the incident directions of the respective illumination light components of the wavelengths to the spatial light modulator are set by the illumination optical system so that the diffracted waves of any order out of the reproduced light components of the wavelengths are superimposed on each other in the aperture after the wavefront transformation by the reproduced image transforming optical system.

In the 3D image display apparatus or the 3D image display method according to the present invention, the illumination optical system preferably comprises a plurality of monochromatic light sources having their respective output wavelengths different from each other, a plurality of pinholes disposed in proximity to the respective monochromatic light sources, and a collimating optical system for collimating light having been emitted from the respective monochromatic light sources and having passed through the pinholes.

In the 3D image display apparatus or the 3D image display method according to the present invention, the illumination optical system preferably comprises an achromatic lens having an identical focal length for the light components of the wavelengths, and the reproduced image transforming optical system preferably comprises an achromatic lens having an identical focal length for the light components of the wavelengths.

In the 3D image display apparatus or the 3D image display method according to the present invention, more preferably, the incident directions of the respective illumination light components of the wavelengths to the spatial light modulator are set by the illumination optical system so that zero-order diffracted waves of the respective reproduced light components of the wavelengths are superimposed on each other in the aperture after the wavefront transformation by the reproduced image transforming optical system.

In the 3D image display apparatus or the 3D image display method according to the present invention, the incident directions of the respective illumination light components of the wavelengths to the spatial light modulator may be so set by the illumination optical system that an illumination light component of any one specific wavelength out of the wavelengths is normally incident to the spatial light modulator and that a zero-order diffracted wave of a reproduced light component of the specific wavelength and a higher-order diffracted wave of a reproduced light component of another wavelength are superimposed on each other in the aperture after the wavefront transformation by the reproduced image transforming optical system.

In the 3D image display apparatus or the 3D image display method according to the present invention, where P represents a pixel pitch of the spatial light modulator, f a focal length of the reproduced image transforming optical system, $n_1$ an order of a diffracted wave of a reproduced light component of a shortest wavelength $\lambda_1$ out of the wavelengths, and $n_i$ an order of a diffracted wave of a reproduced light component of another wavelength $\lambda_i$, an incidence angle $\theta_I$ of an illumination light component of the wavelength $\lambda_i$ to the spatial light modulator is expressed by an equation below:

$$\theta_i = \sin^{-1}\{(n_1\lambda_1 - n_i\lambda_i)/P\}, \text{ and}$$

the aperture is preferably of a rectangular shape having a length of not more than $\lambda_1 f/P$ on each side.

In the 3D image display apparatus or the 3D image display method according to the present invention, preferably, the spatial light modulator has a transmission type structure in which the reproduced light components are emitted on the side opposite to the side where the illumination light components are incident, or a reflection type structure in which the reproduced light components are emitted on the same side as the side where the illumination light components are incident. In a case where the spatial light modulator has the reflection type structure, the illumination optical system and the reproduced image transforming optical system preferably share one or more optical components.

In the 3D image display apparatus or the 3D image display method according to the present invention, the spatial light modulator may be provided with microlenses for respective pixels.

Each of embodiments of the present invention will become more fully understandable in view of the detailed description and accompanying drawings which will follow. It is noted that these embodiments are presented merely for illustrative purposes only but are not to be construed in a way of limiting the invention.

The range of further application of the present invention will become apparent in view of the following detailed description. However, the detailed description and specific examples will describe the preferred embodiments of the present invention, but it is apparent that they are presented for illustrative purposes only and that various modifications and improvements falling within the spirit and scope of the present invention are obvious to those skilled in the art in view of the detailed description.

BEST MODE FOR CARRYING OUT THE INVENTION

Each of embodiments of the 3D image display apparatus and 3D image display method according to the present invention will be described below in detail with reference to FIGS. 1 to FIG. 36. Identical or equivalent elements will be denoted by the same reference symbols in the description of the drawings, without redundant description. For convenience' sake of description, a coordinate system in each drawing is the xyz orthogonal coordinate system in which the z-axis is defined along a direction normal to the spatial light modulator.

(First Embodiment)

Figure 1:
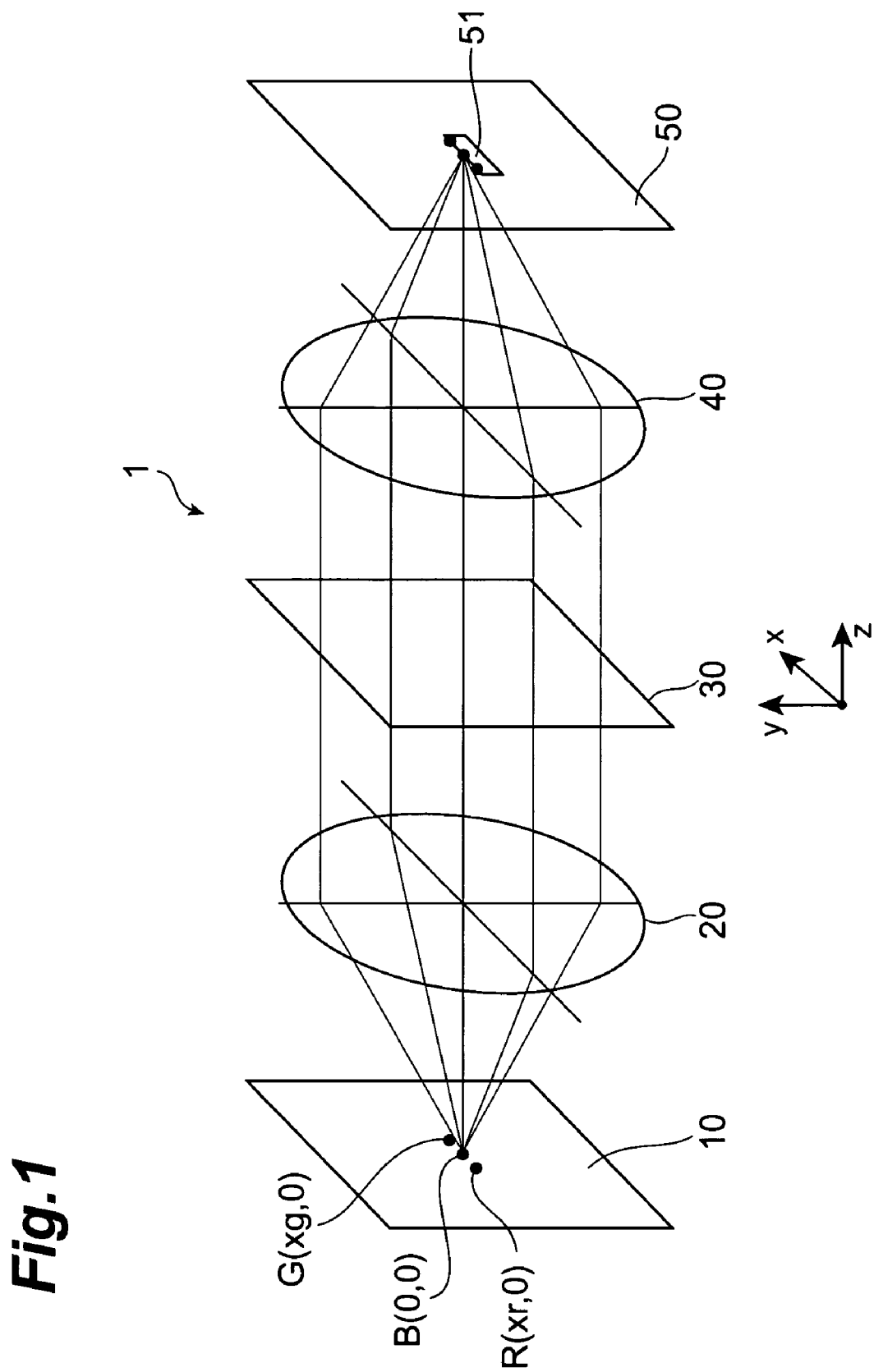
FIG. 1 is an illustration showing a configuration of a first embodiment of the 3D image display apparatus according to the present invention.

First, the first embodiment of the 3D image display apparatus and 3D image display method according to the present invention will be described. FIG. 1 is an illustration showing a configuration of the first embodiment of the 3D image display apparatus according to the present invention. The 3D image display apparatus 1 shown in this figure has an illumination light source section 10, a lens 20, a spatial light modulator 30 of the transmission type, a lens 40, and a mask 50. The illumination light source section 10 and the lens 20 constitute an illumination optical system for converting each of illumination light components of three wavelengths into a parallel plane wave and making the parallel plane waves incident from mutually different incident directions to the spatial light modulator 30. The lens 40 constitutes a reproduced image transforming optical system for subjecting each of reproduced images of the three wavelengths generated from holograms presented on the spatial light modulator 30, to wavefront transformation into a virtual image or a real image.

The illumination light source section 10 has three point light sources for emitting their respective illumination light components of mutually different wavelengths (red, green, and blue) These three point light sources are located at mutually different positions on a straight line parallel to the x-axis. The point light source for emitting the blue illumination light component of the shortest wavelength is located at a position B(0,0) on the optical axis of the illumination optical system. The point light source for emitting the red illumination light component is located at a position $R(x_r,0)$. The point light source for emitting the green illumination light component is located at a position $G(x_g,0)$. Each point light source includes, for example, a light emitting diode, a laser diode, or the like and emits an illumination light component with excellent monochromaticity. The point light sources each are sequentially lit as pulsed in time series.

The lens 20 has the optical axis parallel to the z-axis, and collimates each of illumination light components of the respective wavelengths emitted from the three corresponding point light sources of the illumination light source section 10, into a parallel plane wave and makes the parallel plane waves incident from mutually different incident directions to the spatial light modulator 30. In a case where the lens 20 is comprised of a single convex lens, the spacing between each of the three point light sources and the lens 20 is equal to the focal length of the lens 20. Since the three point light sources are located at the aforementioned positions, the blue illumination light component is normally incident to the spatial light modulator 30, while the illumination light components of red and green are obliquely incident to the spatial light modulator 30. The lens 20 is preferably an achromatic lens having an identical focal length for the wavelengths of the respective illumination light components.

The spatial light modulator 30 is a transmission type spatial light modulator having the discrete pixel structure, and sequentially presents holograms associated with the three respective wavelengths, in time series. These holograms may be amplitude holograms or phase holograms. Then the spatial light modulator 30 sequentially presents holograms associated with wavelengths at respective points of time, in synchronism with time-series sequential incidence of the illumination light components of the respective wavelengths from the lens 20. This results in sequentially outputting reproduced light components of the respective wavelengths in time series. Namely, the field sequential system is adopted for the spatial light modulator 30.

The lens 40 functions to subject each of reproduced images of the three wavelengths generated from the holograms presented on the spatial light modulator 30, to wavefront transformation into a virtual image or a real image, and then to make each image pass on the plane of the mask 50. In a case where the lens 40 is comprised of a single convex lens, the spacing between the lens 40 and the mask 50 is equal to the focal length of the lens 40. The lens 40 is preferably an achromatic lens having an identical focal length for the wavelengths of the respective illumination light components.

The mask 50 is provided on the focal plane of the lens 40 and has an aperture 51. This aperture 51 has a rectangular shape each side of which is parallel to the x-axis or to the y-axis, and has a function of selecting only diffracted waves of zero order generated from the spatial light modulator 30, a function of blocking zero-order directly transmitted light from the spatial light modulator 30, and a function of blocking unwanted light of light components of zero-order diffracted waves which are generated from the holograms presented on the spatial light modulator 30 and which form a real image or a conjugate image to cause the problem of double images. The zero-order directly transmitted light from the spatial light modulator 30 is light contributing to image formation of the light sources as condensed by the lens 40, and becomes background light of a reproduced image to degrade contrast. The aperture 51 is located in an area in which diffracted waves of any order out of the reproduced light components of the three wavelengths are superimposed on each other after the wavefront transformation by the lens 40. Particularly, in the present embodiment, the aperture 51 is located in an area where the zero-order diffracted waves of the respective reproduced light components of the three wavelengths are superimposed on each other after the wavefront transformation by the lens 40. In this manner, the incident directions of the respective illumination light components of the three wavelengths to the spatial light modulator 30 are set by the illumination optical system.

Figure 2:
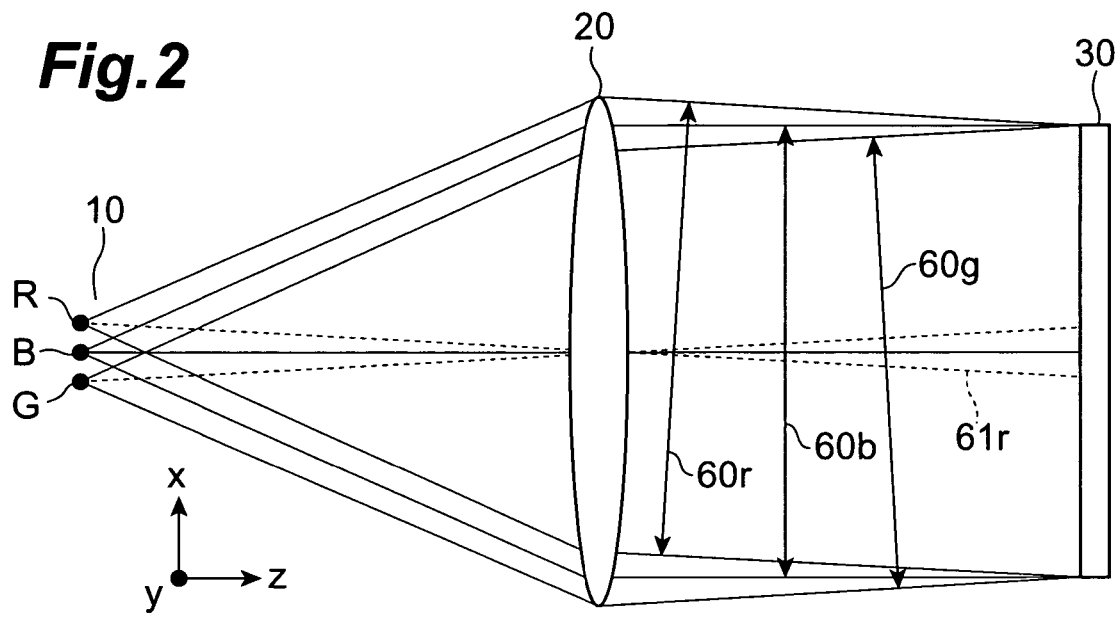
FIG. 2 is an illustration for explaining an illumination optical system and a spatial light modulator of the 3D image display apparatus according to the first embodiment.

FIG. 2 is an illustration for explaining the illumination optical system and spatial light modulator 30 of the 3D image display apparatus 1 according to the first embodiment. As shown in this figure, the blue point light source in the illumination light source section 10 is located on the optical axis of the lens 20, and the illumination light component emitted from this blue point light source is collimated by the lens 20 into a parallel plane wave $60_b$ to be normally incident to the spatial light modulator 30. The red point light source is located at the position separated from the optical axis of the lens 20, and the illumination light component emitted from this red point light source is collimated by the lens 20 into a parallel plane wave $60_r$ traveling in a direction $61_r$ inclined relative to the z-axis to be obliquely incident to the spatial light modulator 30. The green point light source is located in a manner similar to the red point light source.

Figure 3:
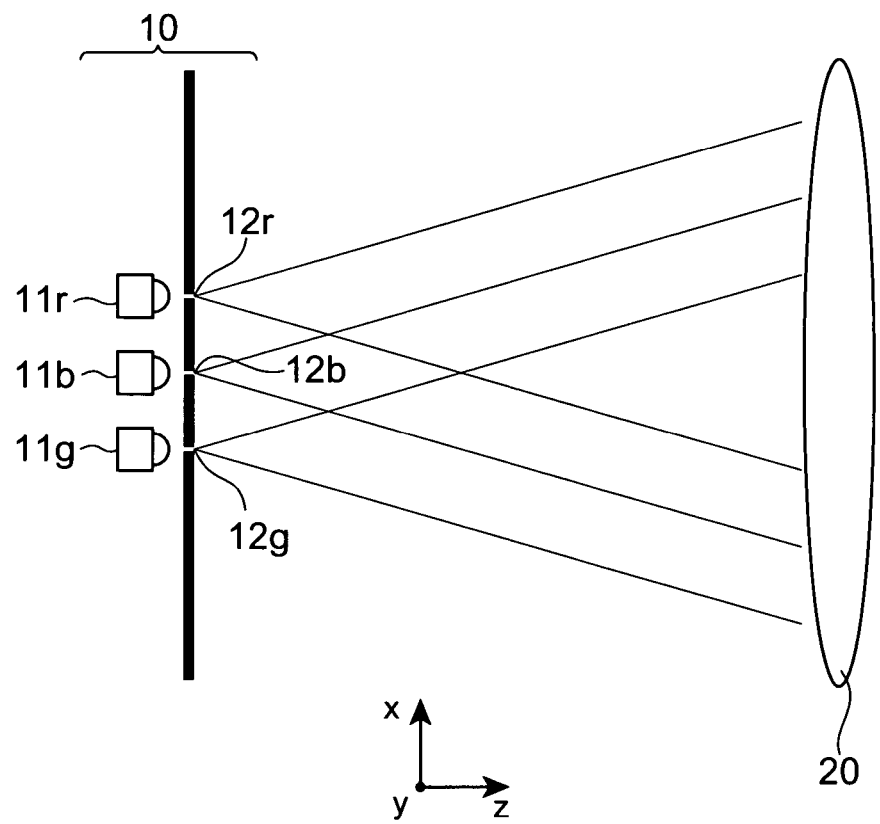
FIG. 3 is an illustration for explaining the illumination optical system of the 3D image display apparatus according to the first embodiment.

FIG. 3 is an illustration for explaining the illumination optical system of the 3D image display apparatus 1 according to the first embodiment. As shown in this figure, the illumination light source section 10 includes three monochromatic light sources $11_r$, $11_g$, and $11_b$ of mutually different output wavelengths, and three pinholes $12_r$, $12_g$, and $12_b$. The pinhole $12_r$ is located at the position $R(x_r,0)$ in proximity to the monochromatic light source $11_r$ for emitting the red light, and outputs the light emitted from this monochromatic light source $11_r$, toward the lens 20. The pinhole $12_g$ is located at the position $G(x_g,0)$ in proximity to the monochromatic light source $11_g$ for emitting the green light, and outputs the light emitted from this monochromatic light source $11_g$, toward the lens 20. The pinhole $12_b$ is located at the position B(0,0) in proximity to the monochromatic light source $11_b$ for emitting the blue light, and outputs the light emitted from this monochromatic light source $11_b$, toward the lens 20. By adopting this configuration, even in a case where each of the monochromatic light sources $11_r$, $11_g$, and $11_b$ cannot be treated as a point light source, the illumination light component emitted from each of the pinholes $12_r$, $12_g$, and $12_b$ can be treated as light emitted from a point light source and the lens 20 can convert it into an ideal parallel plane wave.

Next, the operation of the 3D image display apparatus 1 according to the first embodiment will be described. In a case where an element capable of modulating both the amplitude and phase for each pixel is applied as the spatial light modulator 30, neither transmitted light nor a conjugate image is generated. However, in a case where an element capable of modulating only one of the amplitude and phase for each pixel is applied as the spatial light modulator 30, transmitted light and a conjugate image are generated. The below will describe the latter case.

Figure 4:
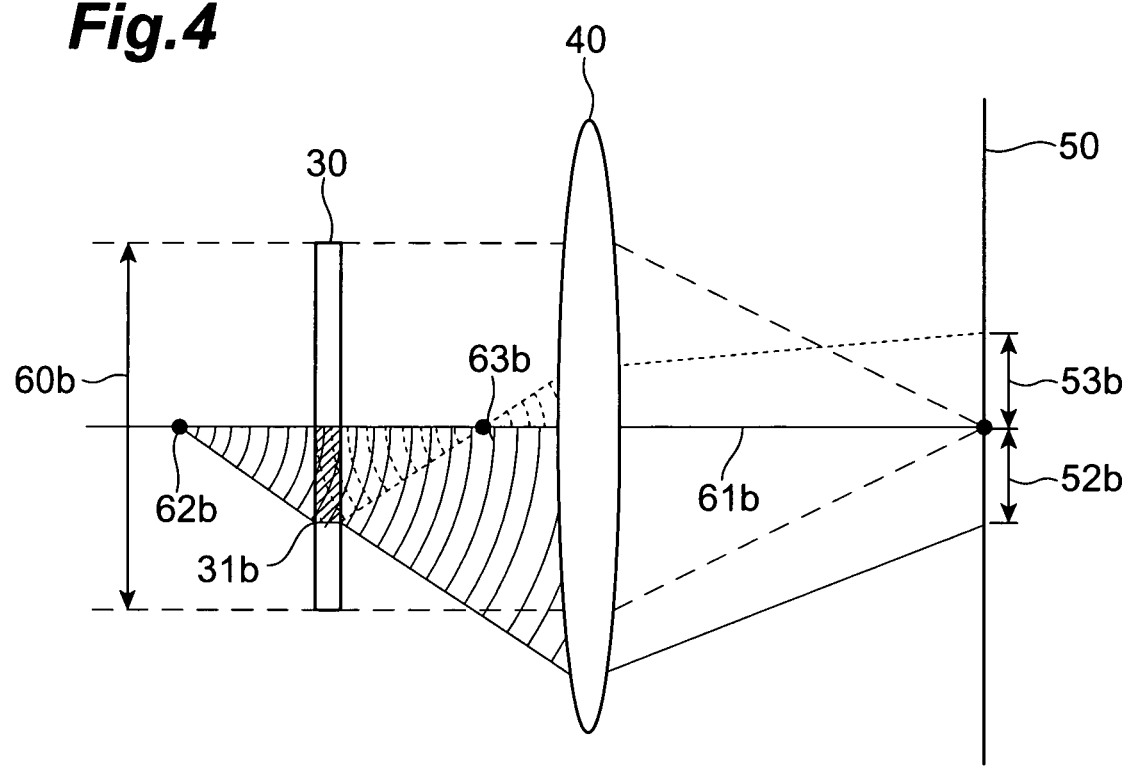
FIG. 4 is an illustration for explaining a display operation of a luminescent point in a 3D image in a case where a blue illumination light component is normally incident to the spatial light modulator, in the 3D image display apparatus according to the first embodiment.
Figure 5:
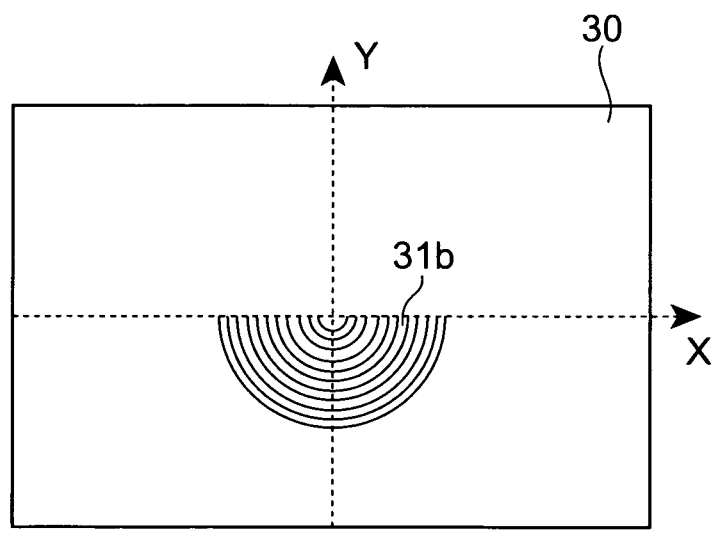
FIG. 5 is an illustration for explaining a hologram presented on the spatial light modulator when the blue illumination light component is normally incident to the spatial light modulator, in the 3D image display apparatus according to the first embodiment.

FIG. 4 is an illustration for explaining a display operation of a luminescent point in a 3D image where the blue illumination light component is normally incident to the spatial light modulator 30 in the 3D image display apparatus 1 according to the first embodiment. FIG. 5 is an illustration for explaining a hologram presented on the spatial light modulator 30 when the blue illumination light component is normally incident to the spatial light modulator 30 in the 3D image display apparatus 1 according to the first embodiment. When a hologram $31_b$ associated with the blue illumination light component is presented on the spatial light modulator 30, the blue illumination light component of a parallel plane wave $60_b$ is normally incident to the spatial light modulator 30. The hologram $31_b$ associated with the blue illumination light component is presented on a half plane (an area of y<0) on the spatial light modulator 30. When the illumination light component is incident to the spatial light modulator 30, a reproduced image $62_b$ and a conjugate image $63_b$ of a luminescent point in the 3D image are formed on the optical axis, and zero-order transmitted light appears. The reproduced image $62_b$ of the luminescent point is subjected to wavefront transformation into an area $52_b$ (in the area of y<0) on the mask 50 by the lens 40. On the other hand, the conjugate image $63_b$ of the luminescent point is subjected to wavefront transformation into an area $53_b$ (in the area of y>0) on the mask 50 by the lens 40. The zero-order transmitted light is converged at the position (0,0) on the mask 50 by the lens 40. Then the conjugate image and the zero-order transmitted light are blocked by the mask 50, and the reproduced image only can be observed through the aperture 51.

Figure 6:
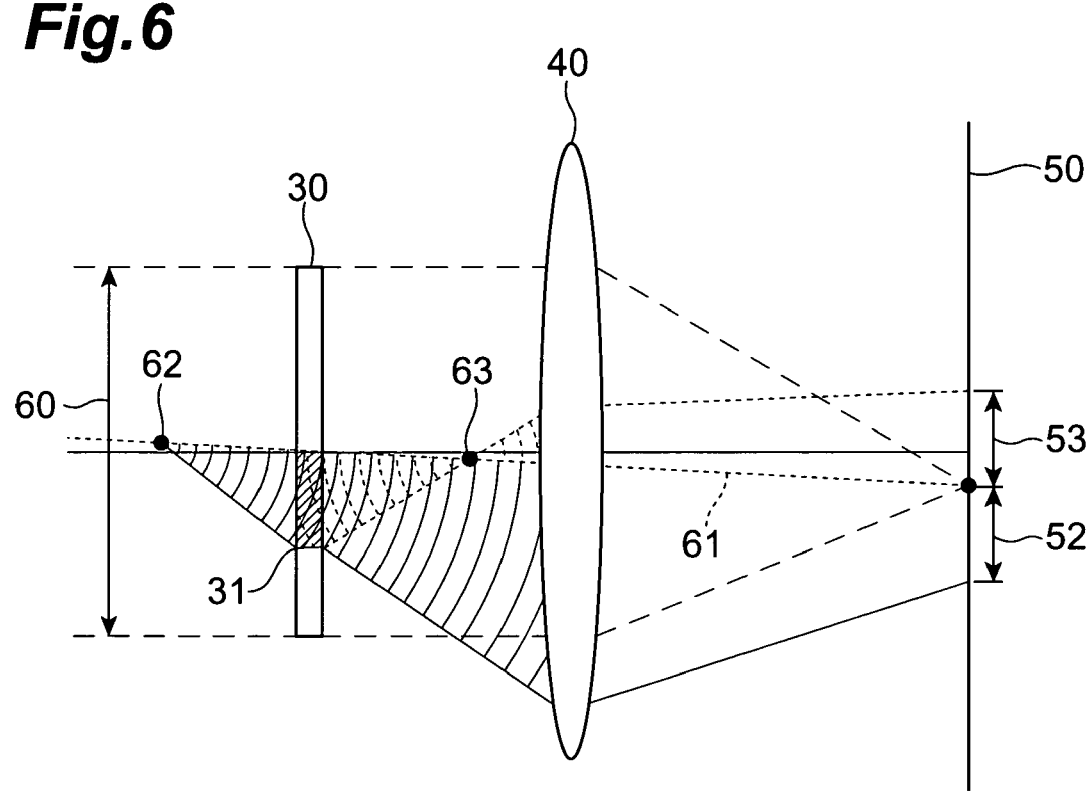
FIG. 6 is an illustration for explaining a display operation of a luminescent point in a 3D image in a case where an illumination light component is obliquely incident to the spatial light modulator, in the 3D image display apparatus according to the first embodiment.

FIG. 6 is an illustration for explaining a display operation of a luminescent point in a 3D image in a case where an illumination light component is obliquely incident to the spatial light modulator 30 in the 3D image display apparatus 1 according to the first embodiment. A hologram presented at this time on the spatial light modulator 30 is assumed to be similar to the hologram shown in FIG. 5. In this case, the illumination light component of a parallel plane wave 60 is obliquely incident to the spatial light modulator 30, whereupon a reproduced image 62 and a conjugate image 63 of the luminescent point in the 3D image are formed on the optical axis 61 of the parallel plane wave 60. This is different from the locations of the reproduced image and conjugate image shown in FIG. 4.

In order to avoid the disagreement between the reproduced image upon the normal incidence and the reproduced image upon the oblique incidence, the present embodiment is arranged to prepare the holograms presented upon the oblique incidence on the spatial light modulator 30, by either of two methods described below.

The first hologram preparing method is a method of calculating the holograms upon the oblique incidence. An object light component from a luminescent point forming a 3D image is expressed by a spherical wave. An object light component $O_{i,j}$ generated from a luminescent point at a position $(x_0, y_0, L_0)$ is expressed by Eqs (1a), (1b) below, at a position $(x_i, y_j, 0)$ on the spatial light modulator 30.

$$O_{i,j} = \frac{1}{r} \exp(jkr) \quad (1a)$$

$$r = \sqrt{(x_i - x_0)^2 + (y_j - y_0)^2 + L_0^2} \quad (1b)$$

Here r represents a distance from the luminescent point at the position $(x_0, y_0, L_0)$ to the position $(x_i, y_j, 0)$ on the spatial light modulator 30, and k the wave number of the object light component. A reference light component $R_{i,j}$ being a parallel plane wave with an incidence angle $\theta$ is expressed by Eq (2) below, at the position $(x_i, y_j, 0)$ on the spatial light modulator 30.

$$R_{i,j} = \exp(jk(L_0 - (x_i - x_0)\sin\theta)) \quad (2)$$

When the synthesis of the object light component and the reference light component on the hologram plane is expressed by Eq (3) below, the phase $\phi_{i,j}$ of light is expressed by Eq (4) below and the light intensity by Eq (5) below, at the position $(x_i, y_j, 0)$ on the hologram plane.

$$O_{i,j} + R_{i,j} = A + jB \quad (3)$$

$$\phi_{i,j} = \tan^{-1}(B/A) \quad (4)$$

$$|O_{i,j} + R_{i,j}|^2 = |O_{i,j}|^2 + |R_{i,j}|^2 + O_{i,j}R_{i,j}^* + O_{i,j}^*R_{i,j} \quad (5)$$

Since the illumination light component incident to the spatial light modulator 30 upon reproduction is equivalent to the reference light component R, a computer-generated hologram is prepared from the third term in the right-hand side of above Eq (5).

Concerning the calculation range of the computer-generated hologram, the maximum spatial frequency of the hologram is restricted by the pixel pitch of the spatial light modulator 30, because the spatial light modulator 30 displaying the hologram has the discrete pixel structure. For this reason, the calculation range is a range in which phase differences between synthetic wavefronts of the object light component and the reference light component at two adjacent pixels are not more than $\pi$, i.e., a half plane determined by a region satisfying the conditions expressed by Expressions (6a), (6b) below.

$$|\phi_{i,j} - \phi_{i-1,j}| \leq \pi \quad (6a)$$

$$|\phi_{i,j} - \phi_{i,j-1}| \leq \pi \quad (6b)$$

Figure 7:
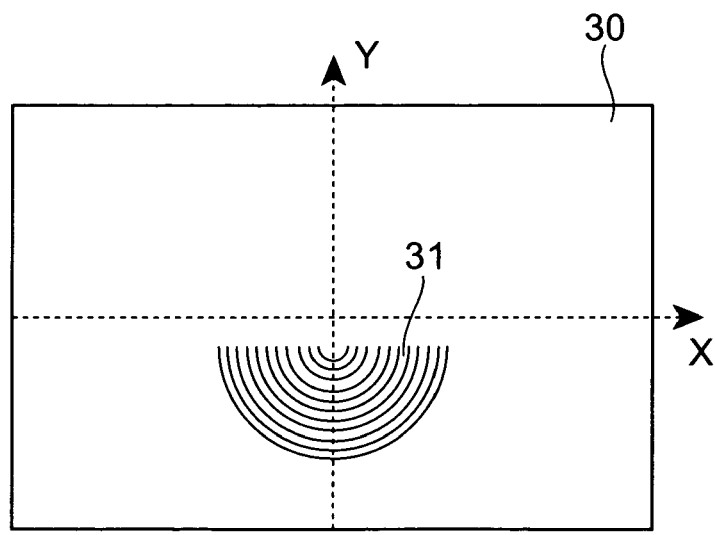
FIG. 7 and FIG. 8 are illustrations for explaining holograms prepared by a first hologram preparing method.
Figure 8:
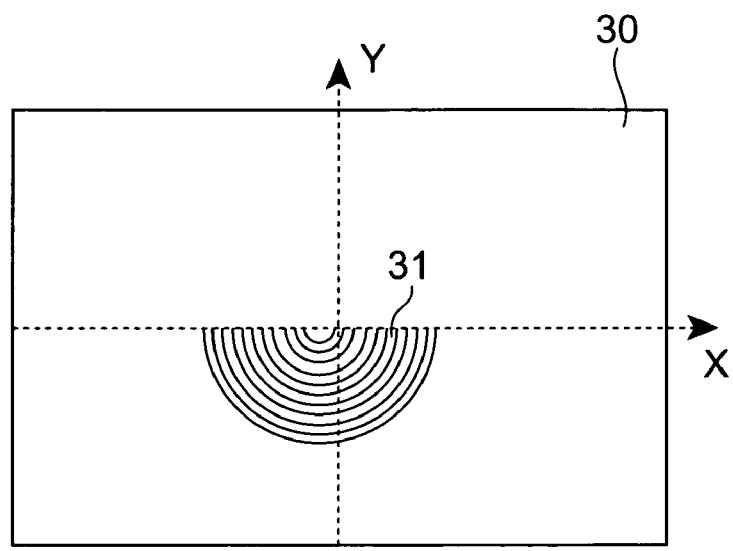

FIGS. 7 and 8 are illustrations each for explaining a hologram prepared by the first hologram preparing method. FIG. 7 shows a presentation range of hologram 31 on the spatial light modulator 30 in a case where a point light source is located at the position (0,y). FIG. 8 shows a presentation range of hologram 31 on the spatial light modulator 30 in a case where a point light source is located at the position (x,0). As shown in these figures, the hologram 31 presented on the spatial light modulator 30 is similar to one obtained by translating the hologram $31_b$ shown in FIG. 5, in parallel with the x-axis or with the y-axis.

Figure 9:
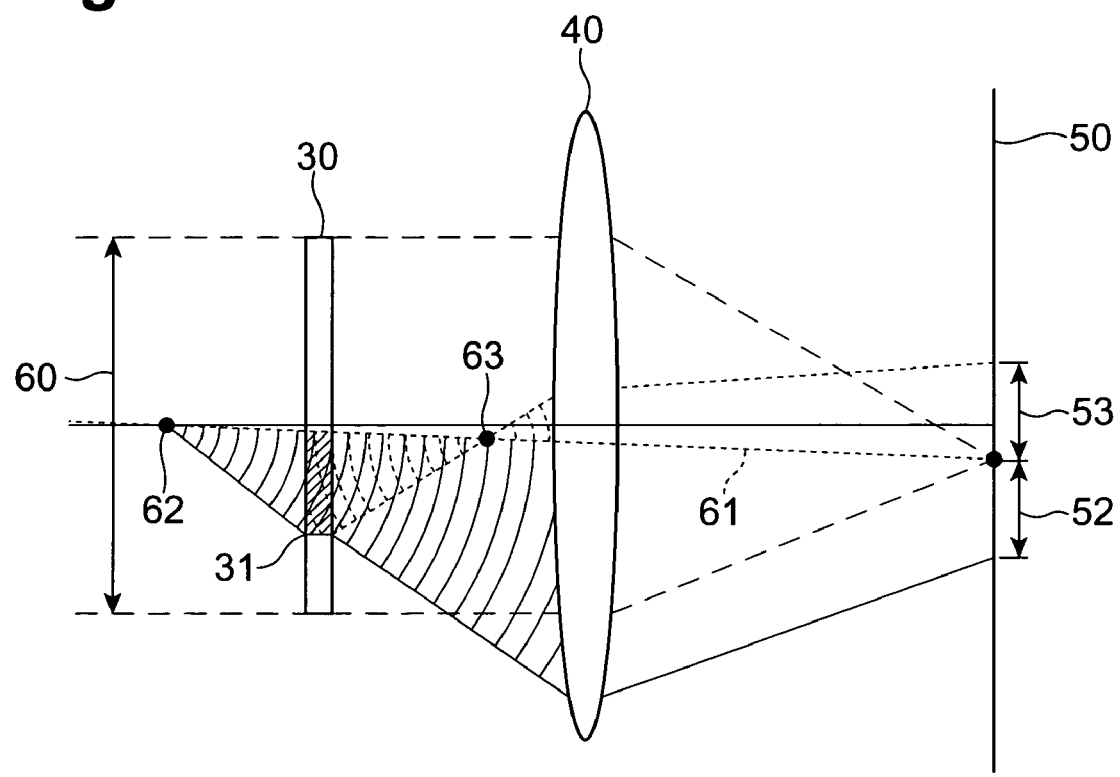
FIG. 9 is an illustration for explaining a display operation of a luminescent point in a 3D image in a case where an illumination light component is obliquely incident to the spatial light modulator while the hologram shown in FIG. 7 is presented on the spatial light modulator.

FIG. 9 is an illustration for explaining a display operation of a luminescent point in a 3D image where an illumination light component is obliquely incident to the spatial light modulator 30 during presentation of the hologram 31 shown in FIG. 7, on the spatial light modulator 30. As shown in this figure, when the illumination light component of a parallel plane wave 60 is obliquely incident to the spatial light modulator 30, a reproduced image 62 of the luminescent point in the 3D image is formed on the optical axis 61. This coincides with the location of the reproduced image shown in FIG. 4.

The second hologram preparing method is a method of translating a hologram presentation range. The foregoing first hologram preparing method requires the process of calculating the product of the object light component and the reference light component in calculation of the hologram because of the oblique incidence of the reference light component, so that the computation time is longer than in the case of the normal incidence of the reference light component. In contrast to it, the second hologram preparing method described below is able to calculate the hologram within a short time by making use of the similarity of the hologram upon the oblique incidence to that upon the normal incidence as described above.

Figure 10:
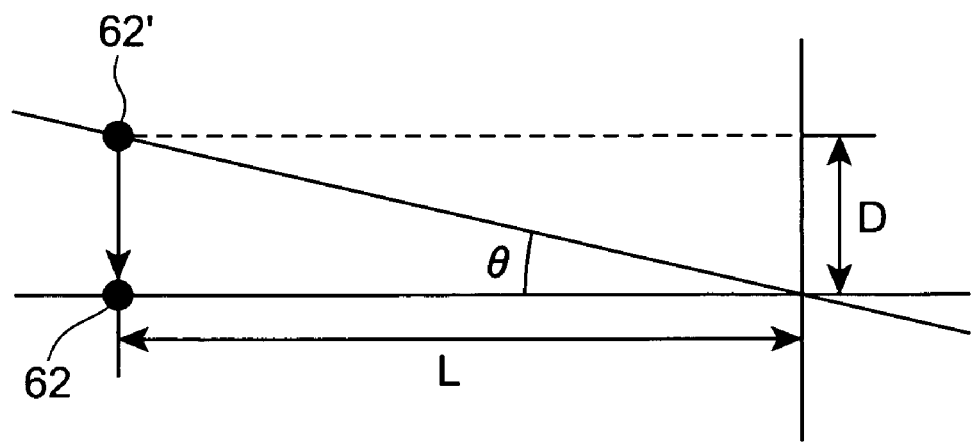
FIG. 10 is an illustration for explaining a second hologram preparing method.

FIG. 10 is an illustration for explaining the second hologram preparing method. Supposing the hologram presented on the spatial light modulator 30 is the same as the hologram shown in FIG. 5, a location of luminescent point 62' generated therefrom is a distance D apart in the x-axis direction from a location of desired luminescent point 62. Therefore, the hologram to be presented can be obtained by translating the presentation location of the hologram by this distance D. This translation distance D is expressed by Eq (7) below.

$$D = L \cdot \tan\theta \tag{7}$$

Here L represents the distance between the luminescent point and the hologram plane. Furthermore, $\theta$ is an incidence angle of the parallel plane wave to the hologram plane, and this incidence angle $\theta$ is expressed by Eq (8) below.

$$\theta = \text{(distance between light source and optical axis)}/\text{(front focal length of lens 20)} \tag{8}$$

The first or second hologram preparing method described above enables the reproduced images to be acquired without deviation between upon the oblique incidence and upon the normal incidence.

Next, reproduced light components generated from the spatial light modulator 30 upon incidence of the illumination light components of the respective wavelengths will be described.

Figure 11:
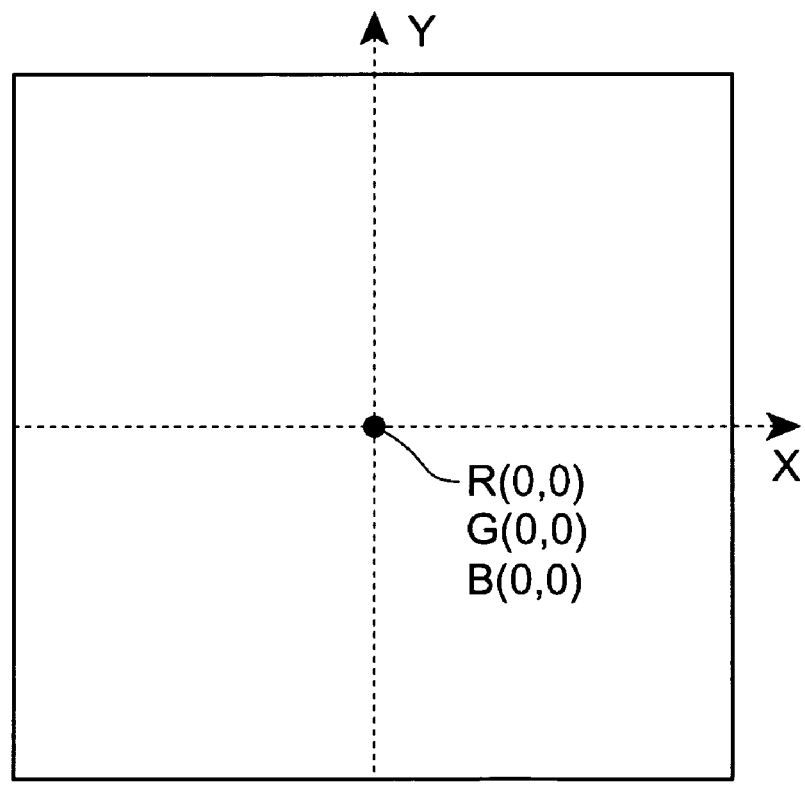
FIG. 11 is an illustration showing arrangement of point light sources of three wavelengths in an ideal case.

FIGS. 11 to 15 are illustrations for explaining an ideal case presented as a comparative example. It is assumed that the spatial light modulator 30 herein is an element capable of modulating only one of the amplitude and phase for each pixel and that a hologram is presented on the half plane (y<0) of the spatial light modulator 30 as shown in FIG. 5, and the case described herein is assumed to be an ideal case where all the point light sources of the three wavelengths are located at the position (0,0) as shown in FIG. 11.

Figure 12:
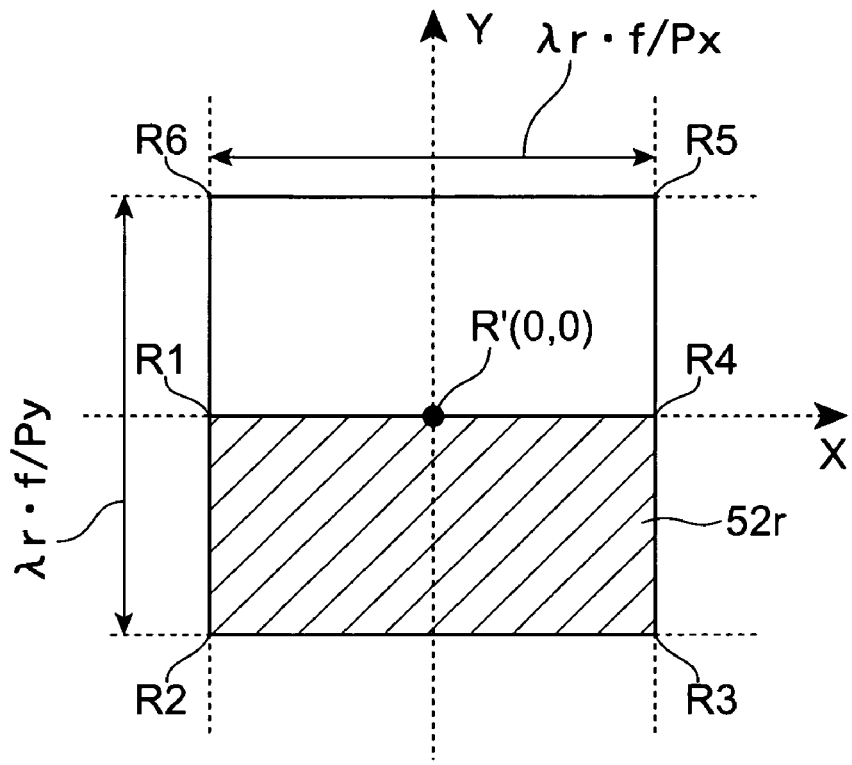
FIG. 12 is an illustration showing a wavefront transformation area of a zero-order diffracted wave of a red reproduced light component at the mask position, in the ideal case.

In this case, as shown in FIG. 12, the zero-order diffracted wave of the red reproduced light component of the longest wavelength generated from the spatial light modulator 30 is subjected to wavefront transformation by the lens 40 into a rectangular area $52_r$ defined by four points R1 to R4 expressed by Expressions (9) below, on the rear focal plane of the lens 40.

$$R1(-\lambda_r f/2P_x, 0)$$

$$R2(-\lambda_r f/2P_x, -\lambda_r f/2P_y)$$

$$R3(+\lambda_r f/2P_x, -\lambda_r f/2P_y)$$

$$R4(+\lambda_r f/2P_x, 0) \tag{9}$$

Here $\lambda_r$ is the wavelength of the red reproduced light component, f the focal length of the lens 40, $P_x$ the pixel pitch in the x-axis direction of the spatial light modulator 30, and $P_y$ the pixel pitch in the y-axis direction of the spatial light modulator 30. A red conjugate image is subjected to wavefront transformation into a rectangular region defined by four points R1 and R4-R6 expressed by Expressions (10) below, on the rear focal plane of the lens 40.

$$R1(-\lambda_r f/2P_x, 0)$$

$$R4(+\lambda_r f/2P_x, 0)$$

$$R5(+\lambda_r f/2P_x, +\lambda_r f/2P_y)$$

$$R6(-\lambda_r f/2P_x, +\lambda_r f/2P_y) \tag{10}$$

With the rectangular region defined by four points R2, R3, R5, and R6, as a unit, zero-order and higher-order reproduced images and conjugate images are two-dimensionally periodically formed on the rear focal plane of the lens 40.

Figure 13:
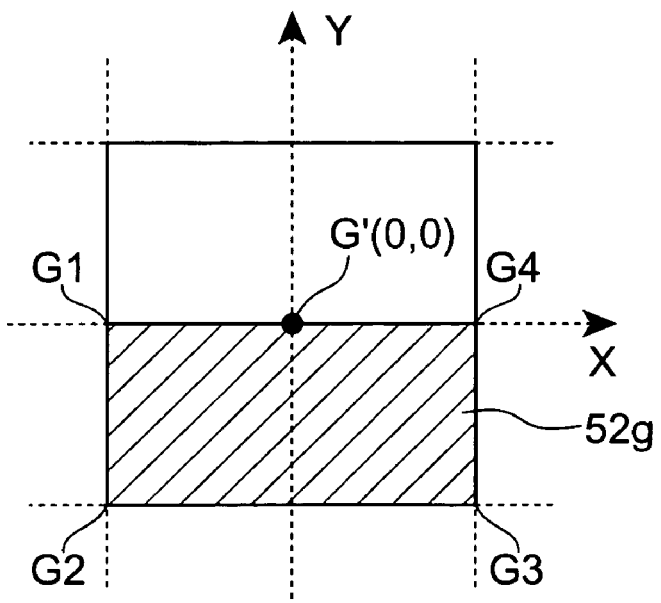
FIG. 13 is an illustration showing a wavefront transformation area of a zero-order diffracted wave of a green reproduced light component at the mask position, in the ideal case.

Likewise, as shown in FIG. 13, the zero-order diffracted wave of the green reproduced light component of the wavelength $\lambda_g$ generated from the spatial light modulator 30 is subjected to wavefront transformation by the lens 40 into a rectangular area $52_g$ defined by four points G1-G4 expressed by Expressions (11) below, on the rear focal plane of lens 40.

$$G1(-\lambda_g f/2P_x, 0)$$

$$G2(-\lambda_g f/2P_x, -\lambda_g f/2P_y)$$

$$G3(+\lambda_g f/2P_x, -\lambda_g f/2P_y)$$

$$G4(+\lambda_g f/2P_x, 0) \tag{11}$$

Figure 14:
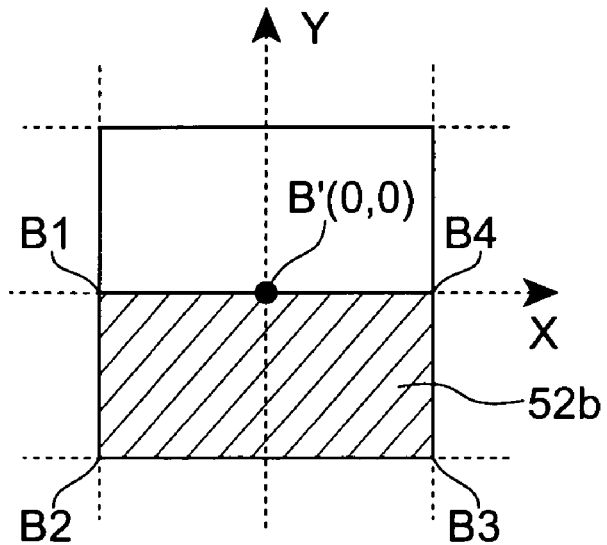
FIG. 14 is an illustration showing a wavefront transformation area of a zero-order diffracted wave of a blue reproduced light component at the mask position, in the ideal case.

In addition, as shown in FIG. 14, the zero-order diffracted wave of the blue reproduced light component of the shortest wavelength $\lambda_b$ generated from the spatial light modulator 30 is subjected to wavefront transformation by the lens 40 into a rectangular area $52_b$ defined by four points B1-B4 expressed by Expressions (12) below, on the rear focal plane of the lens 40.

$$B1(-\lambda_b f/2P_x, 0)$$

$$B2(-\lambda_b f/2P_x, -\lambda_b f/2P_y)$$

$$B3(+\lambda_b f/2P_x, -\lambda_b f/2P_y)$$

$$B4(+\lambda_b f/2P_x, 0) \tag{12}$$

Figure 15:
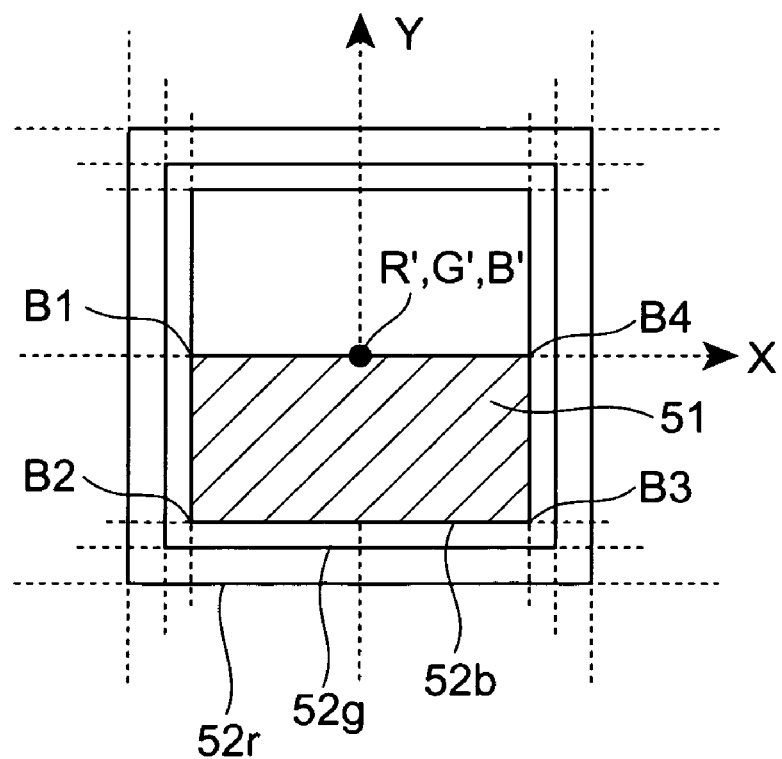
FIG. 15 is an illustration showing the wavefront transformation areas of zero-order diffracted waves of respective reproduced light components of red, green, and blue at the mask position, in the ideal case.

When the wavefront transformation areas $52_r$, $52_g$, and $52_b$ on the rear focal plane of the lens 40 are shown in a superimposed state as shown in FIG. 15, the green wavefront transformation area $52_g$ is included in the red wavefront transformation area $52_r$, and the blue wavefront transformation area $52_b$ is included in the green wavefront transformation area $52_g$. Therefore, a full-color 3D image can be observed when the aperture 51 of the mask 50 is set to be equivalent to the blue wavefront transformation area $52_b$ and when the reproduced light components of the respective colors having passed through this aperture 51 are observed.

However, the ideal case where the three point light sources are located at the common position as shown in FIG. 11 is practically impossible. In the present embodiment, therefore, the three point light sources are located at mutually different positions, an illumination light component of one wavelength out of them is made normally incident to the spatial light modulator 30, and the other illumination light components of remaining two wavelengths are made obliquely incident to the spatial light modulator 30.

Figure 16:
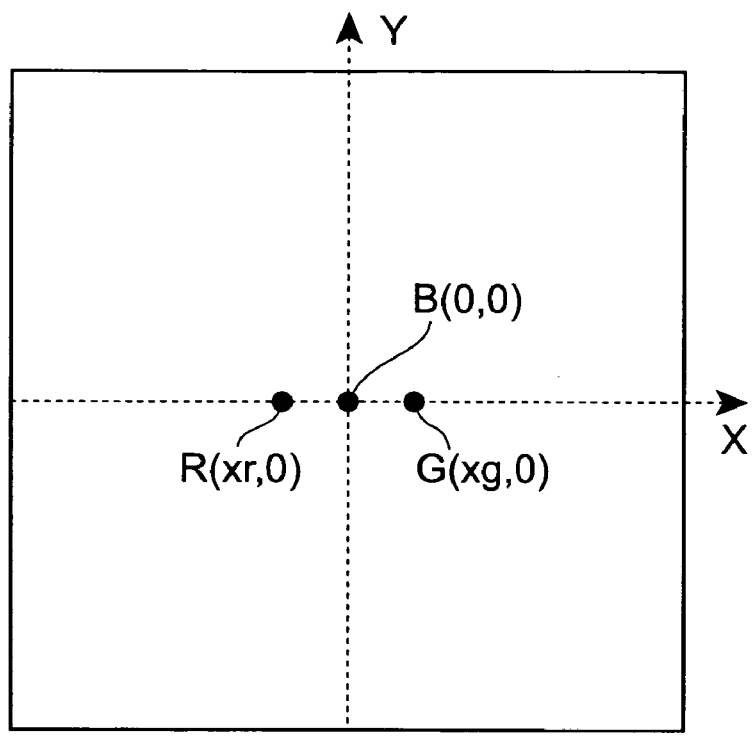
FIG. 16 is an illustration showing arrangement of three point light sources in an illumination light source section 10 of the 3D image display apparatus according to the first embodiment.
Figure 17:
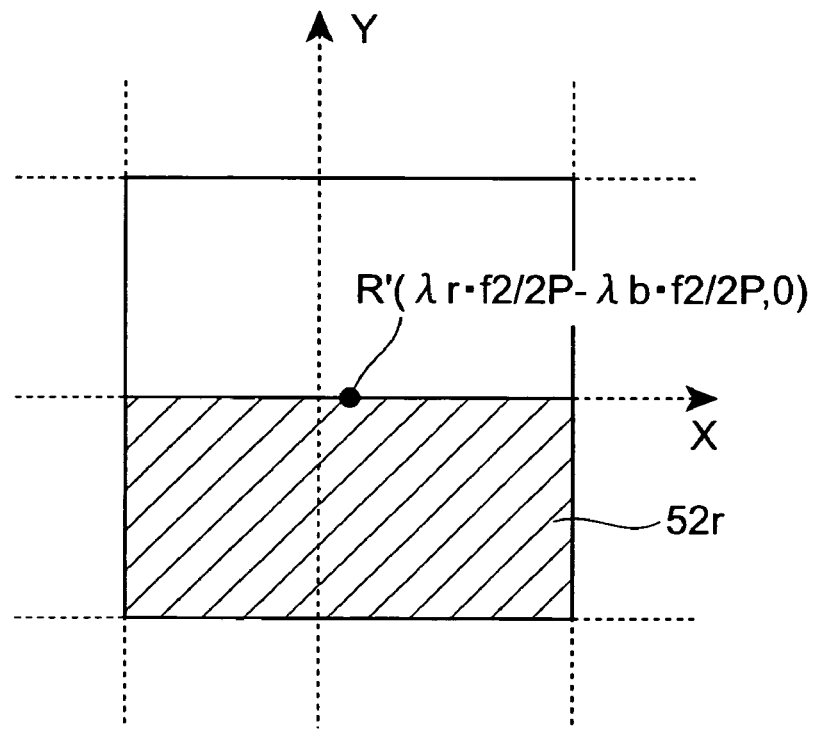
FIG. 17 is an illustration showing a wavefront transformation area of a zero-order diffracted wave of a red reproduced light component at the mask location in the 3D image display apparatus according to the first embodiment.
Figure 18:
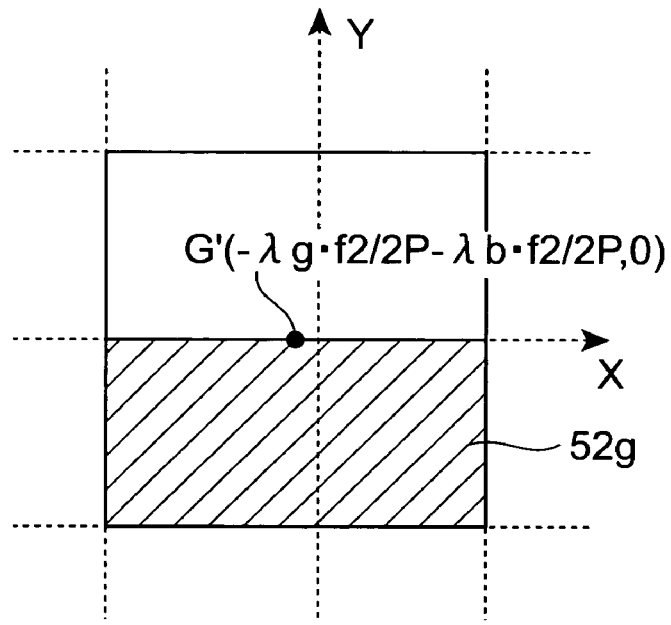
FIG. 18 is an illustration showing a wavefront transformation area of a zero-order diffracted wave of a green reproduced light component at the mask location in the 3D image display apparatus according to the first embodiment.
Figure 19:
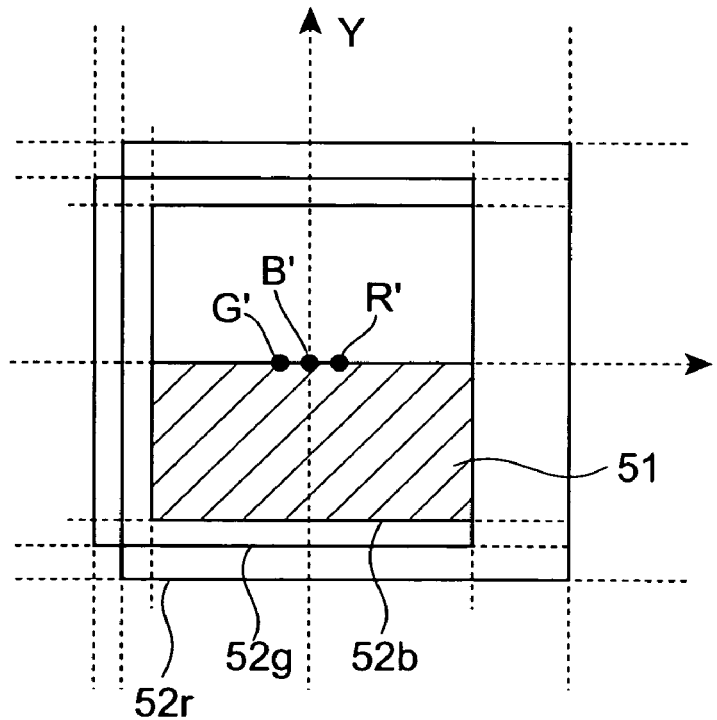
FIG. 19 is an illustration showing wavefront transformation areas of zero-order diffracted waves of respective reproduced light components of red, green, and blue at the mask location in the 3D image display apparatus according to the first embodiment.

FIGS. 16 to 19 are illustrations to illustrate the 3D image display apparatus 1 and 3D image display method according to the first embodiment. FIG. 16 is an illustration showing arrangement of the three point light sources in the illumination light source section 10 of the 3D image display apparatus 1 according to the first embodiment. FIG. 17 is an illustration showing a wavefront transformation area of the zero-order diffracted wave of the red reproduced light component at the location of mask 50 in the 3D image display apparatus 1 according to the first embodiment. FIG. 18 is an illustration showing a wavefront transformation area of the zero-order diffracted wave of the green reproduced light component at the location of mask 50 in the 3D image display apparatus 1 according to the first embodiment. The wavefront transformation area of the zero-order diffracted wave of the blue reproduced light component at the location of mask 50 in the 3D image display apparatus 1 according to the first embodiments is the same as that in the case shown in FIG. 14. FIG. 19 is an illustration showing the wavefront transformation areas of the zero-order diffracted waves of the respective reproduced light components of red, green, and blue at the location of mask 50 in the 3D image display apparatus 1 according to the first embodiment.

In the first embodiment, as shown in FIG. 16, the red point light source is located at the position $R(x_r,0)$, the green point light source at the position $G(x_g,0)$, and the blue point light source at the position $B(0,0)$. Here $x_r$ and $x_g$ each are expressed by Expressions (13) below.

$$x_r = +\{(\lambda_r f_2/2P) - (\lambda_b f_2/2P)\}/M$$

$$x_g = +\{(\lambda_g f_2/2P) - (\lambda_b f_2/2P)\}/M$$

$$M = -f_2/f_1 \qquad (13)$$

Here $f_1$ represents the focal length of lens 20, and $f_2$ the focal length of the lens 40. M is a magnification of the optical system.

In this case, as shown in FIG. 17, the zero-order diffracted wave of the red reproduced light component generated from the spatial light modulator 30 is subjected to wavefront transformation by the lens 40 into a rectangular area $52_r$ based on a position $R'(\lambda_r f_2/2P - \lambda_b f_2/2P, 0)$, on the rear focal plane of lens 40. As shown in FIG. 18, the zero-order diffracted wave of the green reproduced light component generated from the spatial light modulator 30 is subjected to wavefront transformation by the lens 40 into a rectangular area $52_g$ based on a position $G'(-\lambda_g f_2/2P + \lambda_b f_2/2P, 0)$, on the rear focal plane of lens 40. As shown in FIG. 14, the zero-order diffracted wave of the blue reproduced light component generated from the spatial light modulator 30 is subjected to wavefront transformation by the lens 40 into a rectangular area $52_b$ based on the position $B'(0,0)$, on the rear focal plane of lens 40.

When the wavefront transformation areas $52_r$, $52_g$, and $52_b$ on the rear focal plane of lens 40 are shown in a superimposed state as shown in FIG. 19, the green wavefront transformation area $52_g$ is included in the red wavefront transformation area $52_r$, and the blue wavefront transformation area $52_b$ is included in the green wavefront transformation area $52_g$. Therefore, a full-color 3D image can be observed when the aperture 51 of the mask 50 is made coincident with the blue wavefront transformation area $52_b$ and when the reproduced light components of the respective colors having passed through the aperture 51 are observed.

Next, a specific example of the first embodiment will be described. The spatial light modulator 30 used herein was a data projection liquid crystal panel LCX023AL (pixel pitch P=26 μm) available from Sony Corp. The lens 20 was an achromatic lens having the focal length of 600 mm, and the lens 40 an achromatic lens having the focal length of 150 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (−0.69 mm, 0) and the monochromatic light source $11_g$ for emitting green light at the position (+0.69 mm, 0). The aperture diameter of each of the pinholes $12_r$, $12_g$, and $12_b$ was 150 μm. The incidence angle of the red illumination light component to the spatial light modulator 30 was set at +0.07°, and the incidence angle of the green illumination light component to the spatial light modulator 30 at −0.07°. The size of the aperture 51 of the mask 50 was 2.7 mm (W)×1.3 mm (H). The drive frequency of the spatial light modulator 30 was 70 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

Figure 20:
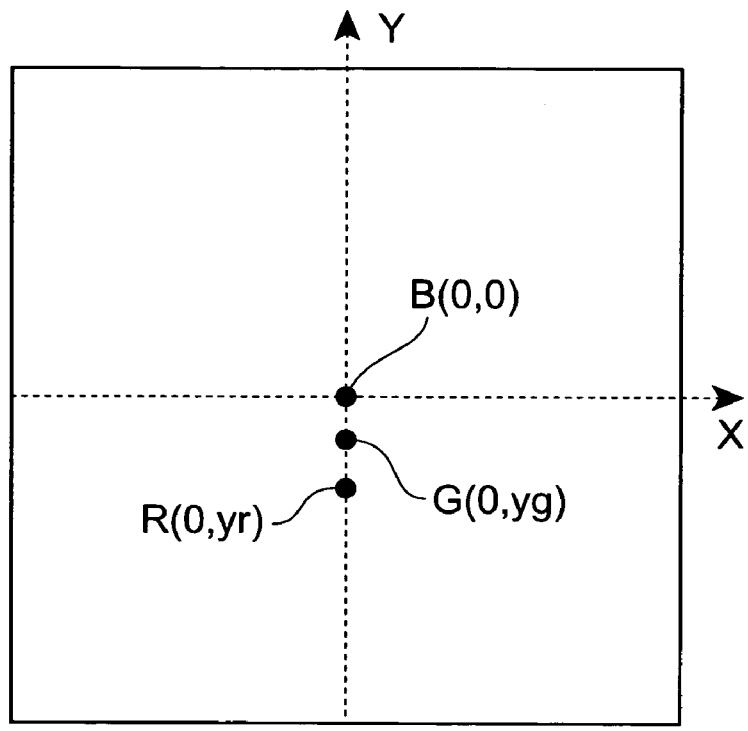
FIG. 20 is an illustration showing arrangement of three point light sources in an illumination light source section in modification example A of the 3D image display apparatus according to the first embodiment.
Figure 21:
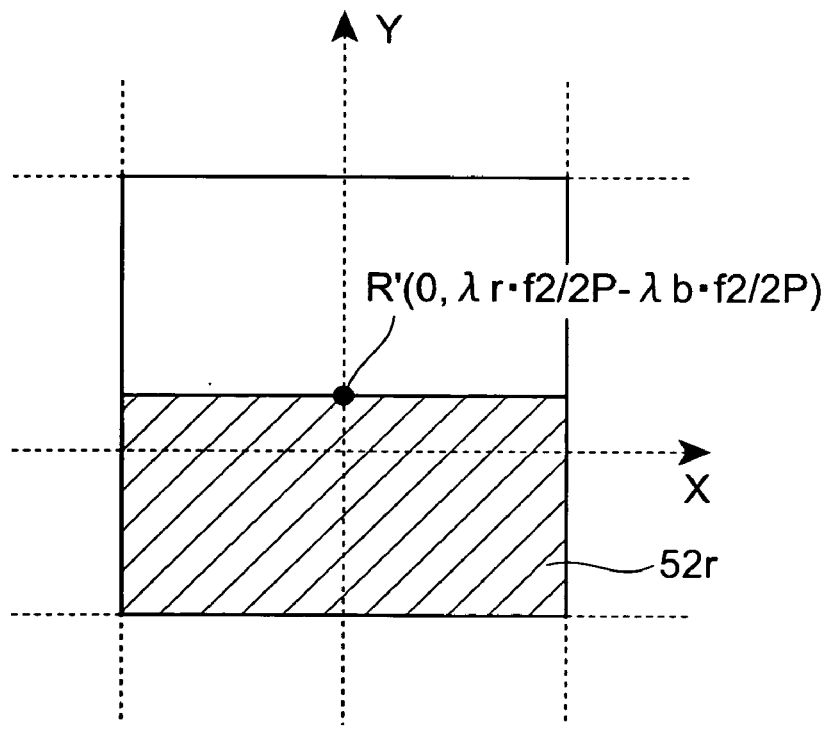
FIG. 21 is an illustration showing a wavefront transformation area of a zero-order diffracted wave of a red reproduced light component at the mask location, in modification example A of the 3D image display apparatus according to the first embodiment.
Figure 22:
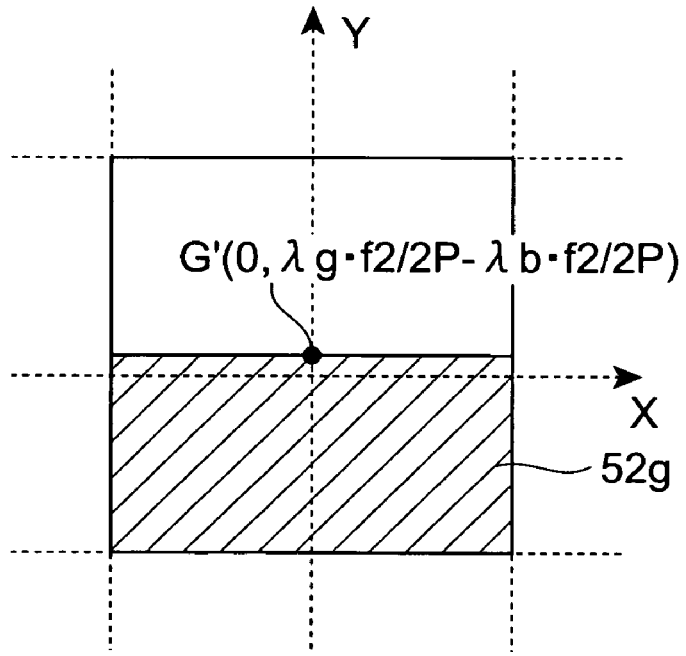
FIG. 22 is an illustration showing a wavefront transformation area of a zero-order diffracted wave of a green reproduced light component at the mask location, in modification example A of the 3D image display apparatus according to the first embodiment.
Figure 23:
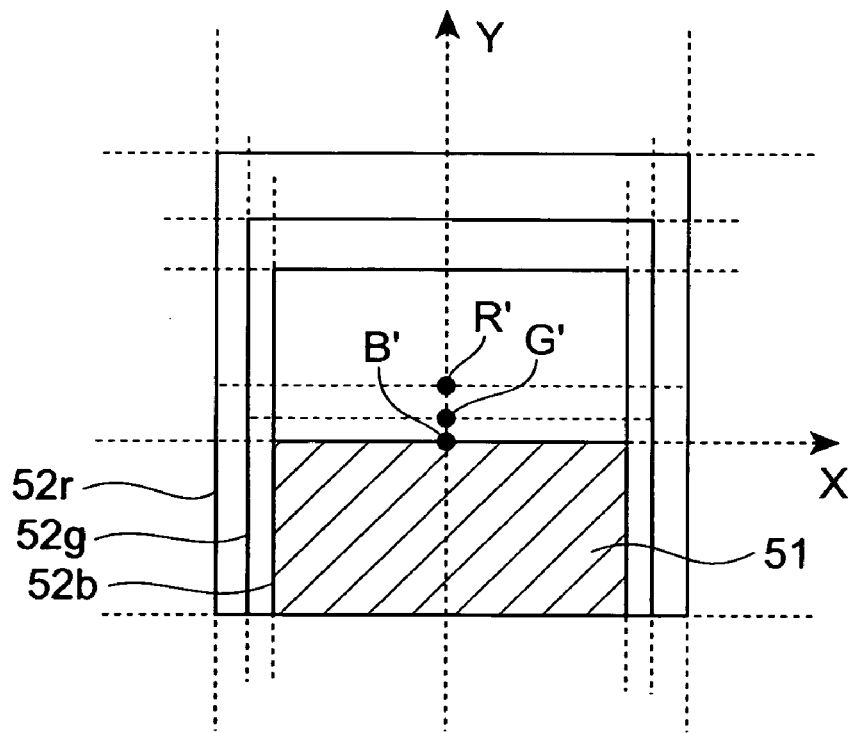
FIG. 23 is an illustration showing wavefront transformation areas of zero-order diffracted waves of respective reproduced light components of red, green, and blue at the mask location, in modification example A of the 3D image display apparatus according to the first embodiment.

Next, modification example A of the 3D image display apparatus and 3D image display method according to the first embodiment will be described. The description heretofore concerned the arrangement of the three point light sources along the x-axis direction, whereas this modification example A concerns arrangement of the three point light sources along the y-axis direction. FIGS. 20 to 23 are illustrations for explaining modification example A of the 3D image display apparatus 1 and 3D image display method according to the first embodiment. FIG. 20 is an illustration showing arrangement of the three point light sources in the illumination light source section 10 in modification example A of the 3D image display apparatus 1 according to the first embodiment. FIG. 21 is an illustration showing the wavefront transformation area of the zero-order diffracted wave of the red reproduced light component at the location of mask 50, in modification example A of the 3D image display apparatus 1 according to the first embodiment. FIG. 22 is an illustration showing the wavefront transformation area of the zero-order diffracted wave of the green reproduced light component at the location of mask 50, in modification example A of the 3D image display apparatus 1 according to the first embodiment. In modification example A of the 3D image display apparatus 1 according to the first embodiment, the wavefront transformation area of the zero-order diffracted wave of the blue reproduced light component at the location of mask 50 is the same as that in the case shown in FIG. 14. FIG. 23 is an illustration showing the wavefront transformation areas of the zero-order diffracted waves of the respective reproduced light components of red, green, and blue at the location of mask 50, in modification example A of the 3D image display apparatus 1 according to the first embodiment.

In this modification example A, as shown in FIG. 20, the red point light source is located at the position $R(0,y_r)$, the green point light source at the position $G(0,y_g)$, and the blue point light source at the position $B(0,0)$. Here $y_r$ and $y_g$ each are expressed by Eqs (14) below.

$$y_r = \{(\lambda_r f_2/2P) - (\lambda_b f_2/2P)\}/M$$

$$y_g = \{(\lambda_g f_2/2P) - (\lambda_b f_2/2P)\}/M \quad (14)$$

In this case, as shown in FIG. 21, the zero-order diffracted wave of the red reproduced light component generated from the spatial light modulator 30 is subjected to wavefront transformation by the lens 40 into a rectangular area $52_r$ based on a position $R'(0, \lambda_r f/2P - \lambda_b f/2P)$, on the rear focal plane of lens 40. In addition, as shown in FIG. 22, the zero-order diffracted wave of the green reproduced light component generated from the spatial light modulator 30 is subjected to wavefront transformation by the lens 40 into a rectangular area $52_g$ based on a position $G'(0, \lambda_g f/2P - \lambda_b f/2P)$, on the rear focal plane of lens 40. Furthermore, as shown in FIG. 14, the zero-order diffracted wave of the blue reproduced light component generated from the spatial light modulator 30 is subjected to wavefront transformation by the lens 40 into the rectangular area $52_b$ based on the position $B'(0,0)$, on the rear focal plane of lens 40.

When the wavefront transformation areas $52_r$, $52_g$, and $52_b$ on the rear focal plane of lens 40 are shown in a superimposed state as shown in FIG. 23, the green wavefront transformation area $52_g$ is included in the red wavefront transformation area $52_r$, and the blue wavefront transformation area $52_b$ is included in the green wavefront transformation area $52_g$. Therefore, a full-color 3D image can be observed when the aperture 51 of the mask 50 is made coincident with the blue wavefront transformation area $52_b$ and when the reproduced light components of the respective colors having passed through this aperture 51 are observed.

Next, a specific example of modification example A of the first embodiment will be described. The spatial light modulator 30 used herein was a data projection liquid crystal panel LCX023AL (pixel pitch P=26 μm) available from Sony Corp. The lens 20 was an achromatic lens having the focal length of 600 mm, and the lens 40 an achromatic lens having the focal length of 150 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (0, −2.08 mm) and the monochromatic light source $11_g$ for emitting green light at the position (0, −0.69 mm). The aperture diameter of each of the pinholes $12_r$, $12_g$, and $12_b$ was 150 μm. The incidence angle of the red illumination light component to the spatial light modulator 30 was set at −0.20°, and the incidence angle of the green illumination light component to the spatial light modulator 30 at −0.07°. The size of the aperture 51 of the mask 50 was 2.7 mm (W)×1.3 mm (H). The drive frequency of the spatial light modulator 30 was 70 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

Figure 24:
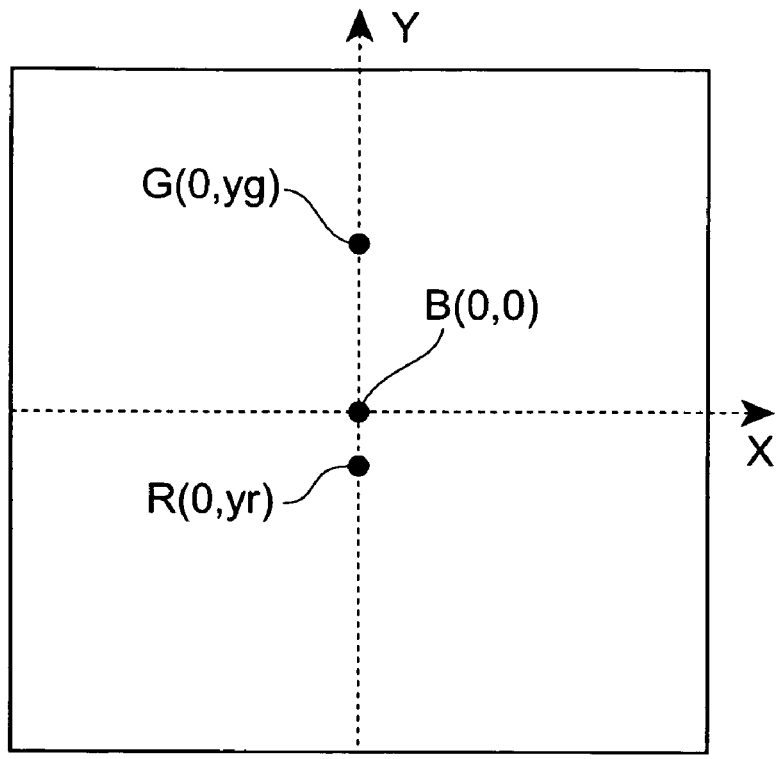
FIG. 24 is an illustration showing arrangement of three point light sources in an illumination light source section in modification example B of the 3D image display apparatus according to the first embodiment.
Figure 25:
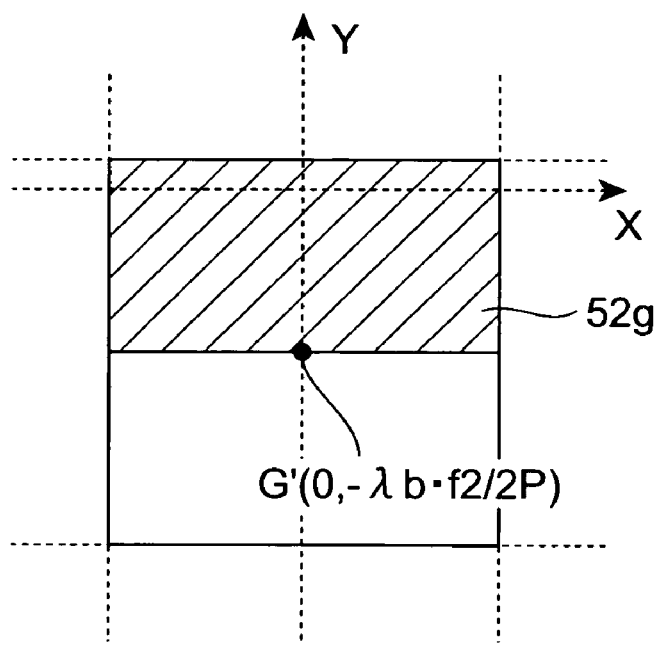
FIG. 25 is an illustration showing a wavefront transformation area of a zero-order diffracted wave of a green reproduced light component at the mask location, in modification example B of the 3D image display apparatus according to the first embodiment.
Figure 26:
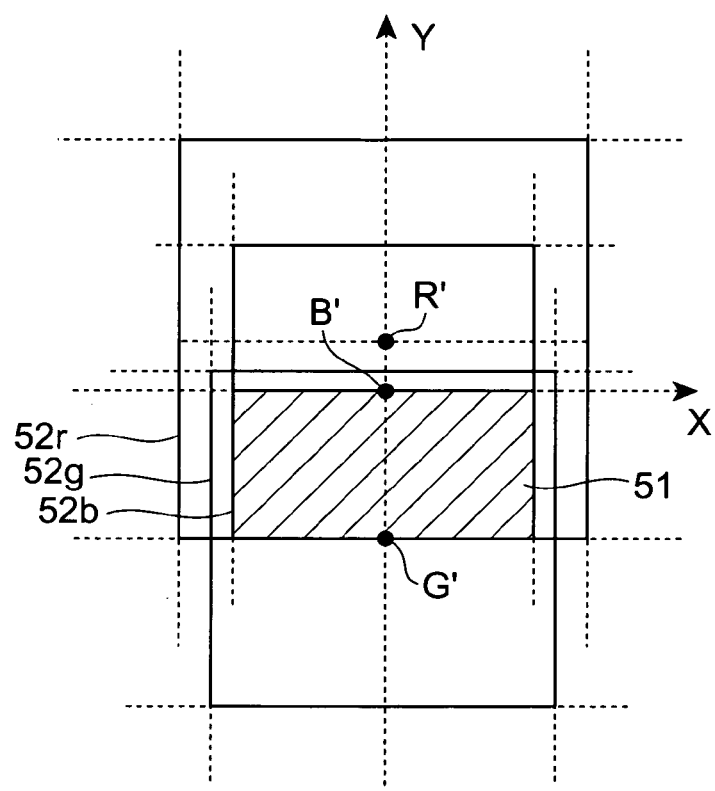
FIG. 26 is an illustration showing wavefront transformation areas of zero-order diffracted waves of respective reproduced light components of red, green, and blue at the mask location, in modification example B of the 3D image display apparatus according to the first embodiment.

Next, modification example B of the 3D image display apparatus and 3D image display method according to the first embodiment will be described. In the foregoing modification example A the three point light sources were arranged in the y-axis direction on the half plane (y<0), whereas in this modification example B the red point light source is placed on one half plane (y<0) and the green point light source on the other half plane (y>0). FIGS. 24 to 26 are illustrations for explaining modification example B of the 3D image display apparatus 1 and 3D image display method according to the first embodiment. FIG. 24 is an illustration showing arrangement of the three point light sources in the illumination light source section 10, in modification example B of the 3D image display apparatus 1 according to the first embodiment. FIG. 25 is an illustration showing the wavefront transformation area of the zero-order diffracted wave of the green reproduced light component at the location of mask 50, in modification example B of the 3D image display apparatus 1 according to the first embodiment. In modification example B of the 3D image display apparatus 1 according to the first embodiment, the wavefront transformation area of the zero-order diffracted wave of the red reproduced light component at the location of mask 50 is the same as that in the case shown in FIG. 21. In modification example B of the 3D image display apparatus 1 according to the first embodiment, the wavefront transformation area of the zero-order diffracted wave of the blue reproduced light component at the location of mask 50 is the same as that in the case shown in FIG. 14. FIG. 26 is an illustration showing the wavefront transformation areas of the zero-order diffracted waves of the respective reproduced light components of red, green, and blue at the location of mask 50, in modification example B of the 3D image display apparatus 1 according to the first embodiment.

In this modification example B, as shown in FIG. 24, the red point light source is located at the position $R(0,y_r)$, the green point light source at the position $G(O,y_g)$, and the blue point light source at the position $B(0,0)$. Here $y_r$ and $y_g$ each are expressed by Eqs (15) below.

$$y_r = \{(\lambda_r f_2/2P) - \lambda_b f_2/2P)\}/M$$

$$y_g = -(\lambda_b f_2/2P)/M \quad (15)$$

In this case, as shown in FIG. 21, the zero-order diffracted wave of the red reproduced light component generated from the spatial light modulator 30 is subjected to wavefront transformation by the lens 40 into a lower rectangular area $52_r$ based on the position $R'(0, \lambda_r f_2/2P - \lambda_b f_2/2P)$, on the rear focal plane of lens 40. In addition, as shown in FIG. 25, the zero-order diffracted wave of the green reproduced light component generated from the spatial light modulator 30 is subjected to wavefront transformation by the lens 40 into an upper rectangular area $52_g$ based on the position $G'(0, -\lambda_b f_2/2P)$, on the rear focal plane of lens 40. Furthermore, as shown in FIG. 14, the zero-order diffracted wave of the blue reproduced light component generated from the spatial light modulator 30 is subjected to wavefront transformation by the lens 40 into the lower rectangular area $52_b$ based on the position $B'(0,0)$, on the rear focal plane of lens 40.

When the wavefront transformation areas $52_r$, $52_g$, and $52_b$ on the rear focal plane of lens 40 are shown in a superimposed state as shown in FIG. 26, the green wavefront transformation area $52_g$ is included in the red wavefront transformation area $52_r$, and the blue wavefront transformation area $52_b$ is included in the green wavefront transformation area $52_g$. Therefore, a full-color 3D image can be observed when the aperture 51 of the mask 50 is made coincident with the blue wavefront transformation area $52_b$ and when the reproduced light components of the respective colors having passed through this aperture 51 are observed.

Next, a specific example of modification example B of the first embodiment will be described. The spatial light modulator 30 used herein was a data projection liquid crystal panel LCX023AL (pixel pitch P=26 μm) available from Sony Corp. The lens 20 was an achromatic lens having the focal length of 200 mm, and the lens 40 an achromatic lens having the focal length of 150 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (0, −0.69 mm) and the monochromatic light source $11_g$ for emitting green light at the position (0, +1.36 mm). The aperture diameter of each of the pinholes $12_r$, $12_g$, and $12_b$ was 150 μm. The incidence angle of the red illumination light component to the spatial light modulator 30 was set at −0.20°, and the incidence angle of the green illumination light component to the spatial light modulator 30 at +0.39°. The size of the aperture 51 of the mask 50 was 2.7 mm (W)×1.3 mm (H). The drive frequency of the spatial light modulator 30 was 70 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

As described above, the 3D image display apparatus 1 and 3D image display method according to the first embodiment, including modification example A and modification example B, are able to provide color display of a clear 3D image even with use of the spatial light modulator 30 of a low resolution, because the incident directions of the respective illumination light components of the three wavelengths to the spatial light modulator 30 are properly set and the zero-order diffracted waves of the respective reproduced light components of the three wavelengths generated from the spatial light modulator 30 are superimposed on each other in the aperture 51 after the wavefront transformation by the lens 40. There is no need for the half mirror for superposition of the reproduced light components of the three wavelengths as required in conventional technology 2, and no need for the high-speed shutter as required in the third conventional technology, and thus the present embodiment successfully provides the compact and inexpensive 3D image display apparatus.

(Second Embodiment)

Figure 27:
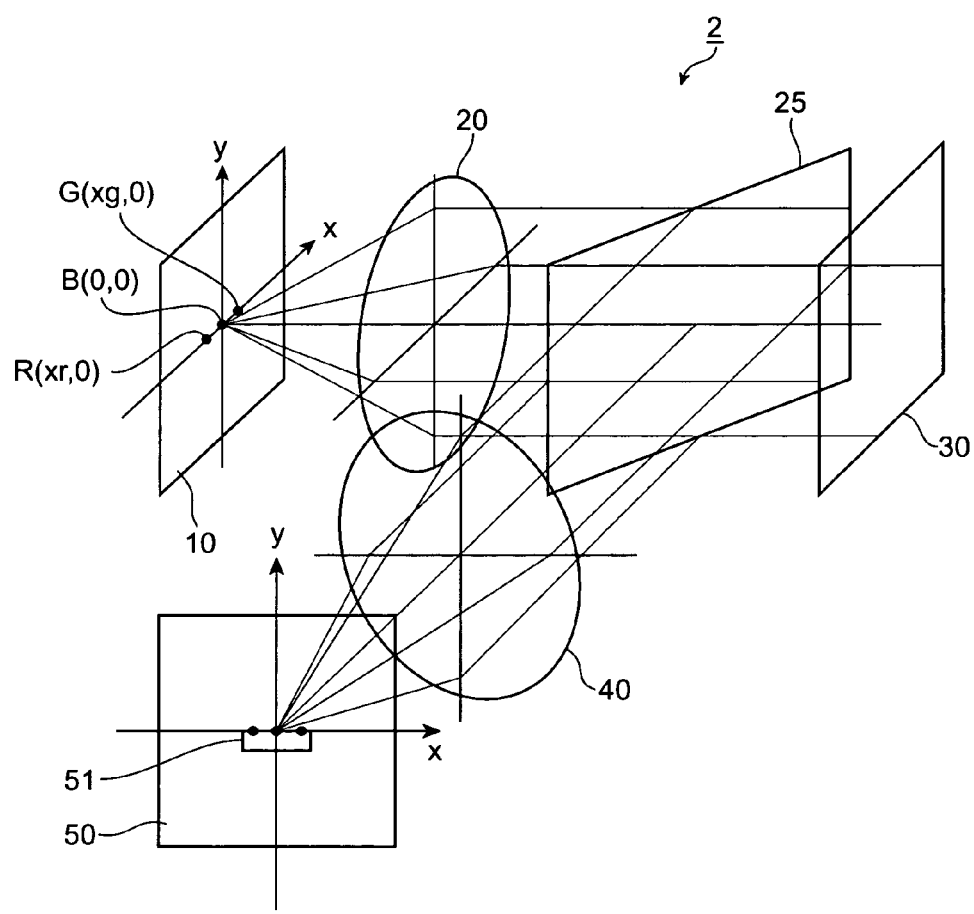
FIG. 27 is an illustration showing a configuration of a second embodiment of the 3D image display apparatus according to the present invention.

Next, the second embodiment of the 3D image display apparatus and 3D image display method according to the present invention will be described. FIG. 27 is an illustration showing a configuration of the 3D image display apparatus 2 according to the second embodiment. The 3D image display apparatus 2 shown in this figure has an illumination light source section 10, a lens 20, a half mirror 25, a reflection type spatial light modulator 30, a lens 40, and a mask 50. The illumination light source section 10, lens 20, and half mirror 25 constitute an illumination optical system for converting each of illumination light components of three wavelengths into a parallel plane wave and making the parallel plane waves incident from mutually different incident directions to the spatial light modulator 30. The half mirror 25 and lens 40 constitute a reproduced image transforming optical system for subjecting each of reproduced light components of the three wavelengths generated from holograms presented on the spatial light modulator 30, to wavefront transformation. The illumination optical system and the reproduced image transforming optical system share the half mirror 25.

When compared with the first embodiment, the 3D image display apparatus 2 and 3D image display method according to the second embodiment are similar thereto in each of the illumination light source section 10, lens 20, lens 40, and mask 50, but are different therefrom in mutual arrangement of the components due to the spatial light modulator 30 being the reflection type spatial light modulator. When compared with the first embodiment, the operation of the 3D image display apparatus 2, and the 3D image display method according to the second embodiment are different therefrom in that each illumination light component, after converted into a parallel plane wave by the lens 20, passes through the half mirror 25 to enter the spatial light modulator 30, in that the reproduced light components emerge on the same side as the side where the illumination light components are incident to the spatial light modulator 30, and in that each reproduced light component is subjected to wavefront transformation by the lens 40 after reflected by the half mirror 25. For the rest, the operation of the 3D image display apparatus 2, and the 3D image display method according to the second embodiment are theoretically similar to those in the first embodiment (including modification examples A and B).

Next, a specific example of the second embodiment will be described. The spatial light modulator 30 used herein was a reflection type liquid crystal panel MD800G6 for micro monitor (pixel pitch P=12.55 μm) available from Micro Display Corp. The lens 20 was an achromatic lens having the focal length of 300 mm, and the lens 40 an achromatic lens having the focal length of 60 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (−0.72 mm, 0) and the monochromatic light source $11_g$ for emitting green light at the position (+0.72 mm, 0). The aperture diameter of each of the pinholes $12_r$, $12_g$, and $12_b$ was 150 μm. The incidence angle of the red illumination light component to the spatial light modulator 30 was set at −0.14°, and the incidence angle of the green illumination light component to the spatial light modulator 30 at +0.14°. The size of the aperture 51 of the mask 50 was 2.2 mm (W)×1.1 mm (H). The drive frequency of the spatial light modulator 30 was 90 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

(Third Embodiment)

Figure 28:
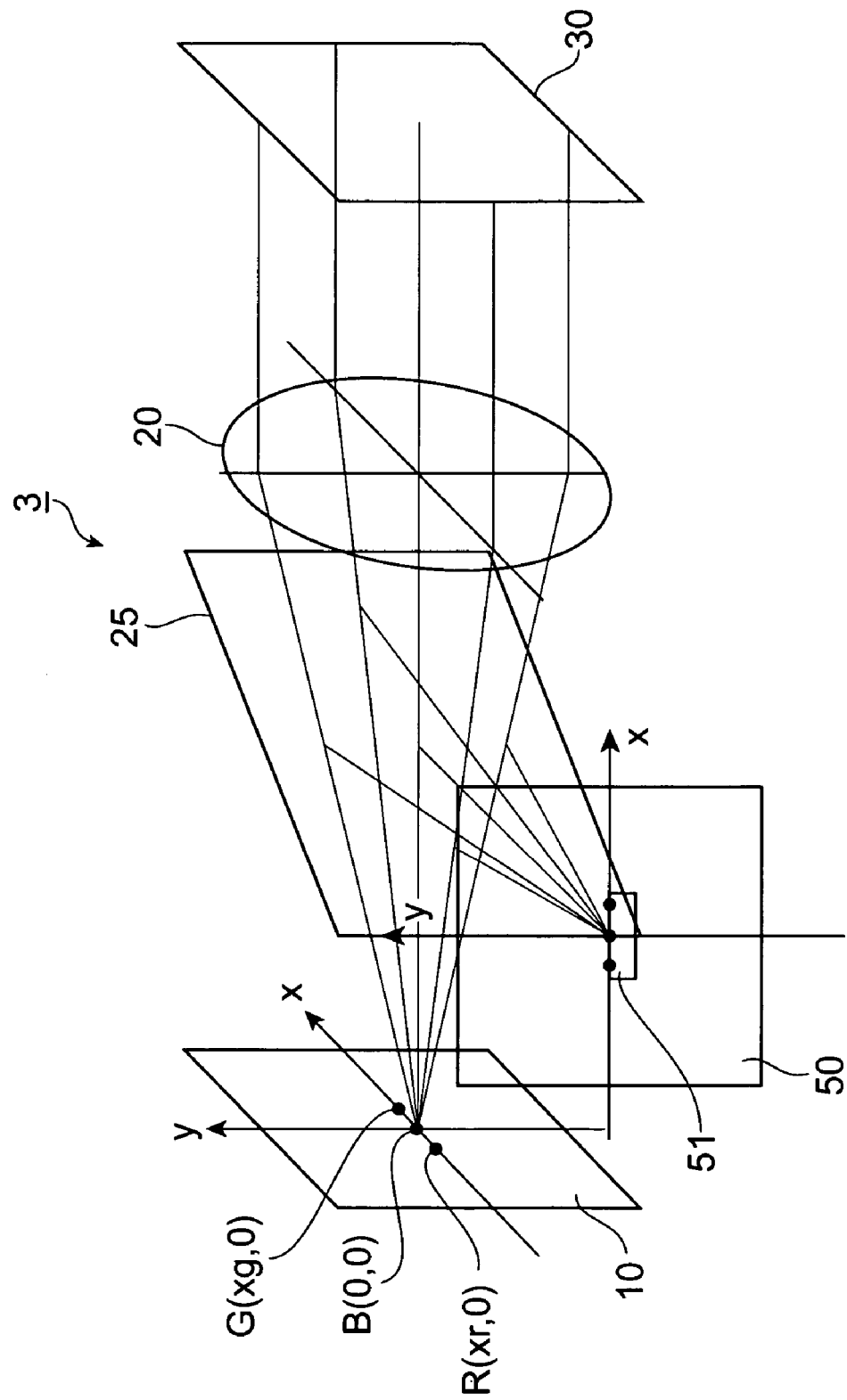
FIG. 28 is an illustration showing a configuration of a third embodiment of the 3D image display apparatus according to the present invention.

Next, the third embodiment of the 3D image display apparatus and 3D image display method according to the present invention will be described. FIG. 28 is an illustration showing a configuration of the 3D image display apparatus 3 according to the third embodiment. The 3D image display apparatus 3 shown in this figure has an illumination light source section 10, a half mirror 25, a lens 20, a reflection type spatial light modulator 30, and a mask 50. The illumination light source section 10, half mirror 25, and lens 20 constitute an illumination optical system for converting each of illumination light components of three wavelengths into a parallel plane wave and making the parallel plane waves incident from mutually different incident directions to the spatial light modulator 30. The lens 20 and half mirror 25 constitute a reproduced image transforming optical system for subjecting each of reproduced light components of the three wavelengths generated from holograms presented on the spatial light modulator 30, to wavefront transformation. The illumination optical system and the reproduced image transforming optical system share the lens 20 and the half mirror 25.

When compared with the second embodiment, the 3D image display apparatus 3 and 3D image display method according to the third embodiment are similar thereto in each of the illumination light source section 10, spatial light modulator 30, and mask 50, but are different therefrom in mutual arrangement of the components because of the spatial light modulator 30 being the reflection type spatial light modulator. When compared with the case of the second embodiment, the operation of the 3D image display apparatus 3, and the 3D image display method according to the third embodiment are different therefrom in that the lens 20 also acts as the lens 40, in that each illumination light component, after passing through the half mirror 25, is converted into a parallel plane wave by the lens 20 to enter the spatial light modulator 30, in that the reproduced light components emerge on the same side as the side where the illumination light components are incident to the spatial light modulator 30, and in that each reproduced light component is subjected to wavefront transformation as reflected by the half mirror 25 after passing through the lens 20. For the rest, the operation of the 3D image display apparatus 3, and the 3D image display method according to the third embodiment are theoretically almost similar to those in the second embodiment.

Figure 29:
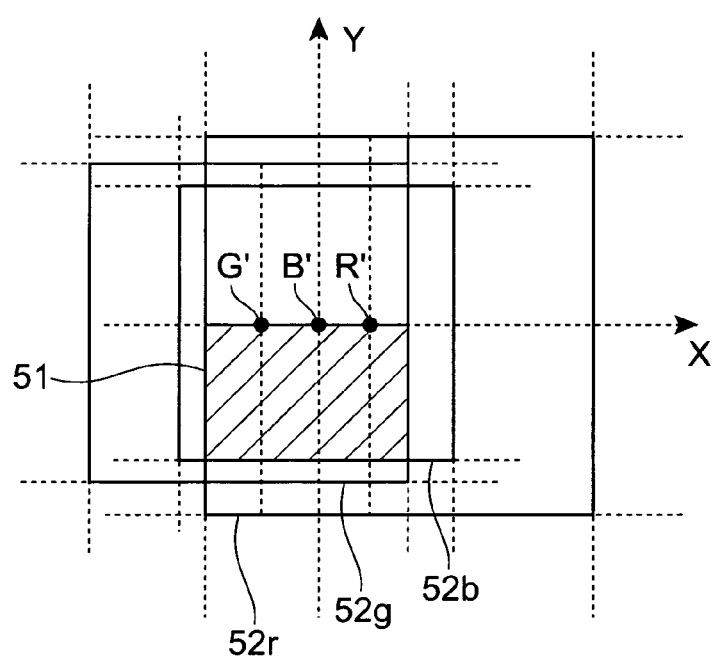
FIG. 29 is an illustration showing wavefront transformation areas of zero-order diffracted waves of respective reproduced light components of red, green, and blue at the mask location in the 3D image display apparatus according to the third embodiment.

Since in the third embodiment the lens 20 also acts as the lens 40, the focal lengths of the illumination optical system and the reproduced image transforming optical system are equal to each other. Therefore, where the three point light sources are located at positions $R(x_r,0)$, $G(x_g,0)$, and $B(0,0)$, reference points of the wavefront transformation areas of the respective colors on the plane of mask 50 are positions $R(-x_r,0)$, $G(-x_g,0)$ and $B(0,0)$. The area where all the wavefront transformation areas $52_r$, $52_g$, and $52_b$ of the respective colors on the plane of mask 50 are superimposed on each other (i.e., the area of the aperture 51 of the mask 50) can be narrower than in the case of the first embodiment or the second embodiment, as shown in FIG. 29.

Next, a specific example of the third embodiment will be described. The spatial light modulator 30 used herein was a reflection type liquid crystal panel MD800G6 for micro monitor (pixel pitch P=12.55 μm) available from Micro Display Corp. The lens 20 also acting as the lens 40 was an achromatic lens having the focal length of 60 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (−0.65 mm, 0) and the monochromatic light source $11_g$ for emitting green light at the position (+0.65 mm, 0). The aperture diameter of each of the pinholes $12_r$, $12_g$, and $12_b$ was 150 μm. The incidence angle of the red illumination light component to the spatial light modulator 30 was set at −0.62°, and the incidence angle of the green illumination light component to the spatial light modulator 30 at +0.62°. The size of the aperture 51 of the mask 50 was 1.5 mm (W)×1.1 mm (H). The drive frequency of the spatial light modulator 30 was 90 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

(Fourth Embodiment)

Figure 30:
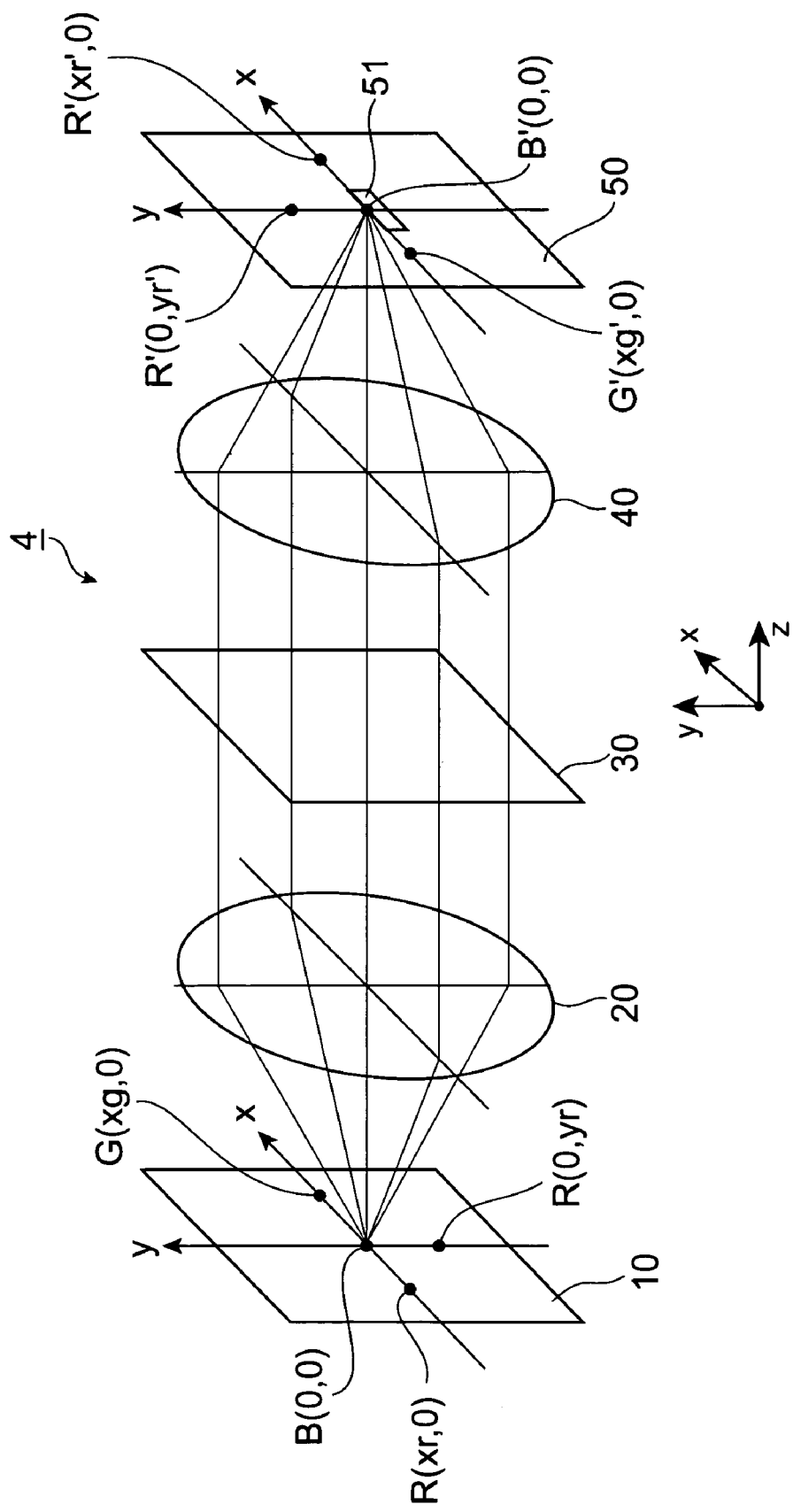
FIG. 30 is an illustration showing a configuration of a fourth embodiment of the 3D image display apparatus according to the present invention.

Next, the fourth embodiment of the 3D image display apparatus and 3D image display method according to the present invention will be described. FIG. 30 is an illustration showing a configuration of the 3D image display apparatus 4 according to the fourth embodiment. The 3D image display apparatus 4 shown in this figure has an illumination light source section 10, a lens 20, a spatial light modulator 30 of the transmission type, a lens 40, and a mask 50. The illumination light source section 10 and the lens 20 constitute an illumination optical system for converting each of illumination light components of three wavelengths into a parallel plane wave and making the parallel plane waves incident from mutually different incident directions to the spatial light modulator 30. The lens 40 constitutes a reproduced image transforming optical system for subjecting each of reproduced images of the three wavelengths generated from holograms presented on the spatial light modulator 30, to wavefront transformation into a virtual image or a real image.

The illumination light source section 10 has three point light sources for emitting their respective illumination light components of mutually different wavelengths (red, green, and blue). These three point light sources are located at mutually different positions on a straight line parallel to the x-axis. The point light source for emitting the blue illumination light component of the shortest wavelength is located at the position B(0,0) on the optical axis of the illumination optical system. The point light source for emitting the red illumination light component is located at the position R(x$_r$,0) or R(0,y$_r$). The point light source for emitting the green illumination light component is located at the position G(x$_g$,0). Each point light source includes, for example, a light emitting diode, a laser diode, or the like and emits an illumination light component with excellent monochromaticity. The point light sources each are sequentially lit as pulsed in time series. The configuration of this illumination light source section 10 is preferably the same as that in FIG. 3.

The lens 20 has the optical axis parallel to the z-axis, and it collimates each of the illumination light components of the respective wavelengths emitted from the three corresponding point light sources of the illumination light source section 10, into a parallel plane wave and makes the parallel plane waves incident from mutually different incident directions to the spatial light modulator 30. In a case where the lens 20 is comprised of a single convex lens, the spacing between each of the three point light sources and the lens 20 is equal to the focal length of the lens 20. Since the three point light sources are located at the aforementioned positions, the blue illumination light component is normally incident to the spatial light modulator 30, while the illumination light components of red and green are obliquely incident to the spatial light modulator 30. The lens 20 is preferably an achromatic lens having an identical focal length for the wavelengths of the respective illumination light components.

The spatial light modulator 30 is a transmission type spatial light modulator having the discrete pixel structure, and sequentially presents holograms associated with the three respective wavelengths, in time series. These holograms may be amplitude holograms or phase holograms. Then the spatial light modulator 30 sequentially presents holograms associated with wavelengths at respective points of time, in synchronism with time-series sequential incidence of the illumination light components of the respective wavelengths from the lens 20. This results in sequentially outputting reproduced light components of the respective wavelengths in time series. Namely, the field sequential system is adopted for the spatial light modulator 30.

The lens 40 subjects each of the reproduced light components of the three wavelengths generated from the holograms presented on the spatial light modulator 30, to wavefront transformation onto the plane of mask 50. In a case where the lens 40 is comprised of a single convex lens, the spacing between the lens 40 and the mask 50 is equal to the focal length of the lens 40. The lens 40 is preferably an achromatic lens having an identical focal length for the wavelengths of the respective illumination light components.

The mask 50 is provided on the focal plane of the lens 40 and has an aperture 51. This aperture 51 has a rectangular shape each side of which is parallel to the x-axis or to the y-axis, and has a function of selecting only diffracted waves of a specific order generated from the spatial light modulator 30, a function of blocking nth-order directly transmitted light from the spatial light modulator 30, and a function of blocking unwanted light of components of nth-order diffracted waves which are generated from the holograms presented on the spatial light modulator 30 and which form a real image or a conjugate image to cause the problem of double images. The nth-order directly transmitted light from the spatial light modulator 30 is light contributing to image formation of the light sources as condensed by the lens 40, and becomes background light of a reproduced image to degrade contrast. The aperture 51 is located in an area in which diffracted waves of any order out of the reproduced light components of the three wavelengths are superimposed on each other after the wavefront transformation by the lens 40. Particularly, in the present embodiment, the aperture 51 is provided in the area where the zero-order diffracted wave of the blue reproduced light component of the shortest wavelength and higher-order diffracted waves of the reproduced light components of the other two wavelengths are superimposed on each other after subjected to wavefront transformation by the lens 40. In this manner, the incident directions of the respective illumination light components of the three wavelengths to the spatial light modulator 30 are set by the illumination optical system.

The zero-order transmitted light having passed through the spatial light modulator 30 among the illumination light component emitted from the blue point light source at the location B(0,0) in the illumination light source section 10 is converged at the position B'(0,0) on the plane of mask 50 by the lens 40. The zero-order transmitted light having passed through the spatial light modulator 30 among the illumination light component emitted from the red point light source at the position R(x$_r$,0) or R(0,y$_r$) in the illumination light source section 10 is converged at the position R'(x$_r$',0) or R'(0,y$_r$') on the plane of mask 50 by the lens 40. The zero-order transmitted light having passed through the spatial light modulator 30 among the illumination light component emitted from the blue point light source at the position G(x$_g$,0) in the illumination light source section 10 is converged at the position G'(x$_g$',0) on the plane of mask 50 by the lens 40.

Figure 31:
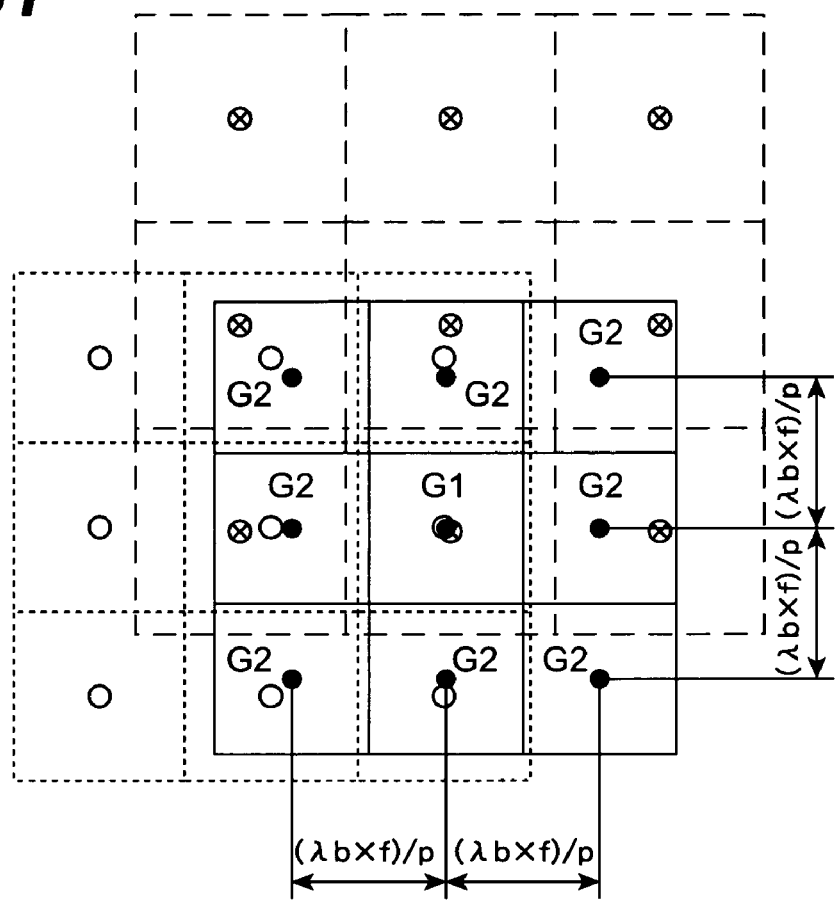
FIG. 31 and FIG. 32 are illustrations showing wavefront transformation areas of diffracted waves of each order of respective reproduced light components of red, green, and blue at the mask location in the 3D image display apparatus according to the fourth embodiment.
Figure 32:
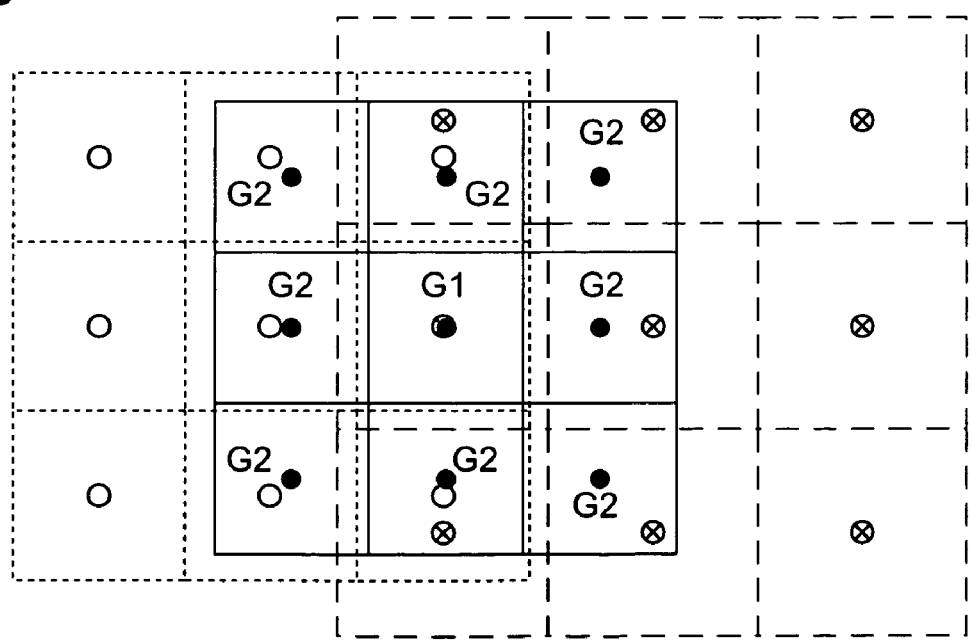

However, since the spatial light modulator 30 has the discrete pixel structure, as shown in FIG. 31 or FIG. 32, the image formation of the blue point light source on the plane of mask 50 obtains the wavefront transformation of the zero-order diffracted wave at the position G$_1$, the wavefront transformation of the first-order diffracted wave at each of eight positions G$_2$ a distance ($\lambda_b$f/P) apart in the direction of the x-axis or the y-axis from the position G$_1$, and the wavefront transformation of higher-order diffracted waves at positions the distance ($\lambda_b$f/P) each further apart in the direction of the x-axis or the y-axis. The same also applies to the image formation of the point light sources of red and green. This will be detailed with reference to FIG. 33.

Figure 33:
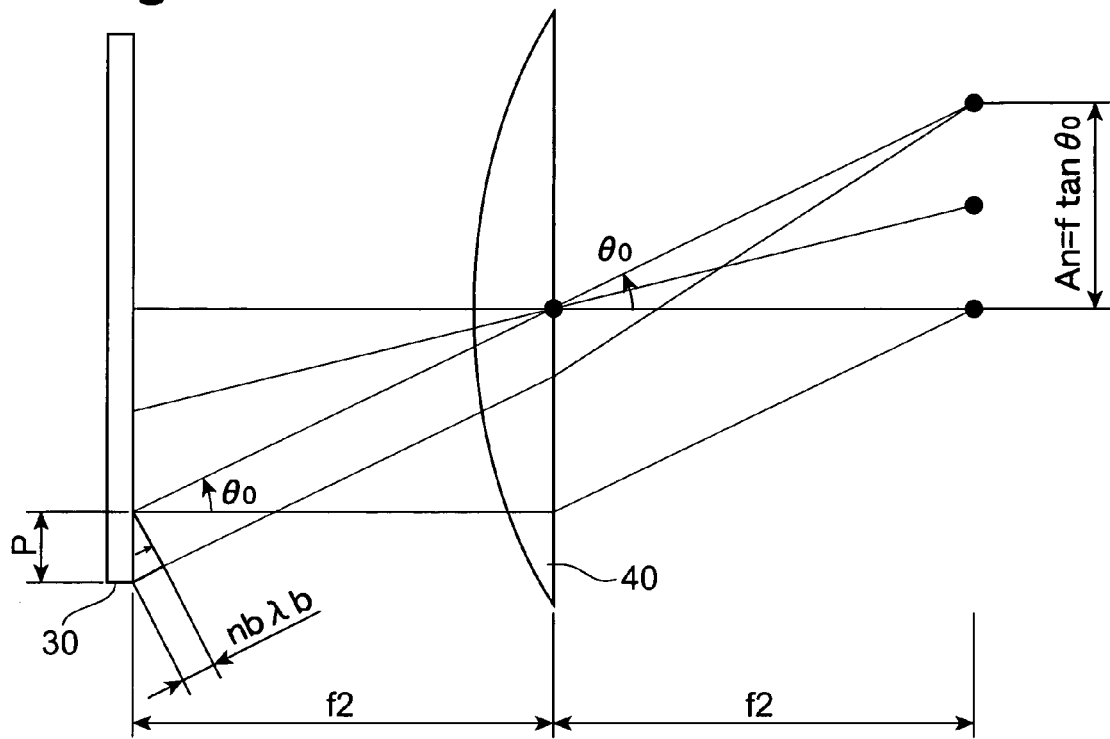
FIG. 33 is an illustration for explaining a spatial light modulator and a wavefront transforming optical system in the 3D image display apparatus according to the fourth embodiment.

FIG. 33 is an illustration for explaining the spatial light modulator 30 and the reproduced image transforming optical system of the 3D image display apparatus 4 according to the fourth embodiment. Let P be the pixel pitch of the spatial light modulator 30, $\lambda_b$ be the wavelength of the blue illumination light component normally incident to the spatial light modulator 30, n$_b$ be the order of the blue diffracted wave emerging from the spatial light modulator 30, and θ$_o$ be the emergence angle of the n$_b$th diffracted wave of blue from the spatial light modulator 30.

In this case, a relation given by Eq (16) below holds among these parameters.

$$P \sin \theta_o = n_b \lambda_b \tag{16}$$

From this Eq (16), the emergence angle θ$_o$ of the blue n$_b$th-order diffracted wave from the spatial is light modulator 30 is expressed by Eq (17) below.

$$\theta_o = \sin^{-1}(n_b \lambda_b / P) \tag{17}$$

The blue n$_b$th-order diffracted wave from the spatial light modulator 30 is converged at the position the distance A$_n$ apart from the optical axis, on the rear focal plane of lens 40 (the plane of mask 50). This distance $A_n$ is represented by Eq (18) below.

$$A_n = f_2 \tan\theta_\theta \qquad (18)$$
$$= f_2 \tan\{\sin^{-1}(n_b\lambda_b/P)\}$$
$$= f_2 \sin\{\sin^{-1}(n_b\lambda_b/P)\}/\cos\{\sin^{-1}(n_b\lambda_b/P)\}$$
$$= (f_2 n_b\lambda_b/P)\cos\{\sin^{-1}(n_b\lambda_b/P)\}$$

As far as the order $n_b$ is small, this Eq (18) is approximated by Eq (19) below.

$$A_n = f_2 n_b \lambda_b / P \qquad (19)$$

As seen from these Eq (18) or Eq (19), points of convergence of the zero-order and higher-order diffracted waves appear at almost equal intervals on the rear focal plane of lens 40 (plane of mask 50), and the appearance intervals of the convergence points of diffracted waves of respective orders are different depending upon the wavelength. Supposing the point light sources of the respective wavelengths in the illumination light source section 10 are present at the same position, the convergence points of the zero-order diffracted waves of the reproduced light components of the respective wavelengths appear at the same position, but the convergence points of the higher-order diffracted waves of the reproduced light components of the respective wavelengths appear at different positions, on the rear focal plane of lens 40 (plane of mask 50).

The diffracted waves forming a 3D reproduced image can be extracted by using the mask 50 with the aperture 51 based on the position expressed by above Eq (18) or Eq (19) and letting only diffracted waves of any order out of the reproduced light components pass through the aperture 51. In a case where the spatial light modulator 30 is able to modulate both the amplitude and phase, the diffracted waves forming the 3D reproduced image can be extracted by placing the aperture 51 of rectangular shape having the length of $f_2\lambda_b/P$ on one side with the center at the position expressed by above Eq (18) or Eq (19). In a case where the spatial light modulator 30 is able to modulate only one of the amplitude and phase, the diffracted waves forming the 3D reproduced image can be extracted by placing the aperture 51 of rectangular shape having the length of $f_2\lambda_b/P$ on one side and the length of $f_2\lambda_b/2P$ on the other side, on the half plane based on the position expressed by above Eq (18) or Eq (19) (a region corresponding to the hologram presentation area on the spatial light modulator 30).

In the present embodiment, concerning the aperture 51 of the mask 50, its area is not controlled in time division for each wavelength, but is constant independent of the wavelengths. Then the aperture 51 placed herein is one having the location and shape adapted to $\lambda_b$ being the shortest wavelength out of the three wavelengths ($\lambda_r$, $\lambda_g$, $\lambda_b$). As for the other two wavelengths ($\lambda_r$, $\lambda_g$), the incident directions of the illumination light components to the spatial light modulator 30 are set so that their diffracted waves of any order out of the reproduced light components pass through the aperture 51. Where the spatial light modulator 30 is able to modulate only one of the amplitude and phase, the convergence points of reproduced waves of the orders used in formation of the 3D image out of the reproduced light components of the respective wavelengths are made coincident with each other, whereby these convergence points are blocked by the mask 50. The lenses 20, 40 suitably applicable herein are lenses adequately compensated for chromatic aberration and having an identical focal length for each of the three wavelengths ($\lambda_r$, $\lambda_g$, $\lambda_b$).

The blue illumination light component is normally incident to the spatial light modulator 30, while the other illumination light components of red and green each are obliquely incident thereto. The convergence point of the zero-order diffracted wave upon the normal incidence of the blue illumination light component must coincide with the convergence points of the higher-order diffracted waves of the specific order upon the oblique incidence of the other color illumination light components on the rear focal plane of lens 40. Angles of incidence of the illumination light components satisfying this condition will be described below with reference to FIG. 34.

Figure 34:
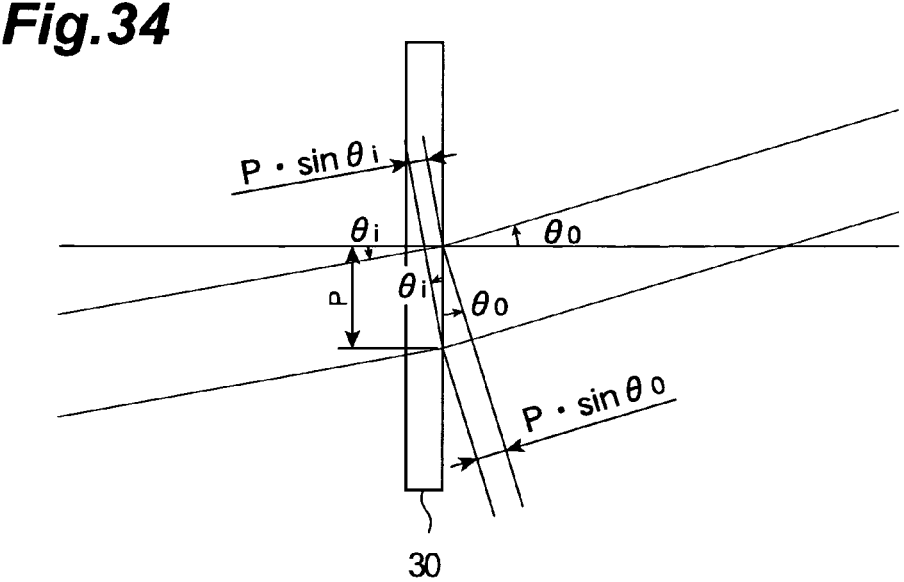
FIG. 34 is an illustration for explaining a relation between an angle of incidence of an illumination light component and an angle of emergence of a reproduced light component in the spatial light modulator of the 3D image display apparatus according to the fourth embodiment.

FIG. 34 is an illustration for explaining the relation between the angle of incidence of an illumination light component and the angle of emergence of a reproduced light component in the spatial light modulator 30 of the 3D image display apparatus 4 according to the fourth embodiment. It is assumed that a parallel plane wave of any one wavelength $\lambda_i$ ($=\lambda_r$ or $\lambda_g$) other than the shortest wavelength $\lambda_b$ is incident at an incidence angle $\theta_i$ to the spatial light modulator 30 and that the diffracted wave of order $n_i$ among the reproduced light component of the wavelength $\lambda_i$ is emergent at a diffraction angle $\theta_o$ (the same as the blue diffracted wave is) from the spatial light modulator 30. The pixel pitch of the spatial light modulator 30 is assumed to be P.

In this case, a relation given by Eq (20) below holds among these parameters.

$$P \sin\theta_o - P \sin\theta_i = n_i \lambda_i \qquad (20)$$

Rewriting this into an equation for the incidence angle $\theta_i$, it is expressed by Eq (21) below.

$$\theta_i = \sin^{-1}\{(P \sin\theta_o - n_i\lambda_i)/P\} \qquad (21)$$

By substituting aforementioned Eq (17), this Eq (21) is expressed by Eq (22) below.

$$\theta_i = \sin^{-1}\{(n_b\lambda_b - n_i\lambda_i)/P\} \qquad (22)$$

When the blue illumination light component of wavelength $\lambda_b$ is normally incident to the spatial light modulator 30 and when the illumination light component of the wavelength $\lambda_i$ ($=\lambda_r$ or $\lambda_g$) is obliquely incident at the incidence angle $\theta_i$ represented by above Eq (22), to the spatial light modulator 30, the diffracted waves of any order among the reproduced light components of the respective wavelengths are emergent at the same diffraction angle $\theta_o$ from the spatial light modulator 30 to be converged at the same point by the lens 40.

From above Eq (20), the incidence angle $\theta_i$ and the emergence angle $\theta_o$ are equal to each other only when the diffraction order $n_i$ is the zero order. The zero-order diffracted wave is converged at the position the distance $A_{ni}$ expressed by Eq (23) below, apart from the optical axis on the rear focal plane of lens 40.

$$A_{ni} = f_2 \tan\theta_i \qquad (23)$$
$$= f_2 \tan[\sin^{-1}\{(n_b\lambda_b - n_i\lambda_i)/P\}]$$
$$= f_2 \tan[\sin^{-1}\{n_b\lambda_b/P\}]$$
$$= f_2(n_b\lambda_b/P)/\cos^{-1}\{\sin(n_b\lambda_b/P)\}$$

As a first example about the distance $A_{ni}$, let us suppose that the order $n_b$ of the diffracted wave of the blue wavelength $\lambda_b$ is 0 and that the order $n_i$ of the diffracted wave of the other wavelength $\lambda_i$ is $-1$. In this case, the incidence angle $\theta_i$ of the illumination light component of the wavelength $\lambda_i$ is represented by Eq (24) below.

$$\theta_i = \sin^{-1}(\lambda_i/P) \quad (24)$$

The zero-order diffracted wave of the wavelength $\lambda_i$ is converged at the position the distance $A_{-1}$ represented by Eq (25) below, apart from the optical axis on the rear focal plane of lens 40.

$$A_{-1} = f_2 \tan\theta_i \quad (25)$$
$$= f_2 \tan[\sin^{-1}(\lambda_i/P)]$$
$$\cong f_2 \lambda_i / P$$

As a second example about the distance $A_{ni}$, let us suppose that the order $n_b$ of the diffracted wave of the blue wavelength $\lambda_b$ is 0 and that the order $n_i$ of the diffracted wave of the other wavelength $\lambda_i$ is $+1$. In this case, the incidence angle $\theta_i$ of the illumination light component of the wavelength $\lambda_i$ is expressed by Eq (26) below.

$$\theta_i = \sin^{-1}(-\lambda_i/P) \quad (26)$$

The zero-order diffracted wave of the wavelength $\lambda_i$ is converged at the position the distance $A_{+1}$ represented by Eq (27) below, apart from the optical axis on the rear focal plane of lens 40.

$$A_{-1} = f_2 \tan\theta_i \quad (27)$$
$$= f_2 \tan[\sin^{-1}(-\lambda_i/P)]$$
$$\cong -f_2 \lambda_i / P$$

The illumination light component of the wavelength $\lambda_i$ can be made incident as a parallel plane wave at the incidence angle $\theta_i$ to the spatial light modulator 30 by placing the point light source at the position the distance $B_{ni}$ represented by Eq (28) below, apart from the optical axis on the front focal plane of the lens 20 having the focal length $f_1$.

$$B_{ni} = -f_1 \tan\theta_i \quad (28)$$
$$= -f_1 \tan[\sin^{-1}\{(n_b\lambda_b - n_1\lambda_1)/P\}]$$

As a first example about the distance $B_{ni}$, let us suppose that the order $n_b$ of the diffracted wave of the blue wavelength $\lambda_b$ is 0 and that the order $n_i$ of the diffracted wave of the other wavelength $\lambda_i$ is $-1$. In this case, the point light source of the wavelength $\lambda_i$ is placed at the position the distance $B_{-1}$ represented by Eq (29) below, apart from the optical axis on the front focal plane of lens 20.

$$B_{-1} = -f_1 \tan\theta_i \quad (29)$$
$$= -f_1 \tan[\sin^{-1}(\lambda_i/P)]$$
$$\cong -f_1 \lambda_i / P$$
$$= A_{-1}/M$$

Here M is the magnification of the optical system expressed by Eq (13).

As a second example about the distance $B_{ni}$, let us suppose that the order $n_b$ of the diffracted wave of the blue wavelength $\lambda_b$ is 0 and that the order $n_i$ of the diffracted wave of the other wavelength $\lambda_i$ is $+1$. In this case, the point light source of the wavelength $\lambda_i$ is placed at the position the distance $B_{+1}$ represented by Eq (30) below, apart from the optical axis on the front focal plane of lens 20.

$$B_{+1} = -f_1 \tan\theta_i \quad (30)$$
$$= -f_1 \tan[\sin^{-1}(-\lambda_i/P)]$$
$$\cong f_1 \lambda_i / P$$
$$= -A_{-1}/M$$

FIG. 31 is an example in which on the front focal plane of lens 20 the red point light source is placed at the position $(-f_1\lambda_r/P, 0)$, the green point light source at the position $(+f_1\lambda_g/P, 0)$, and the blue point light source at the position $(0,0)$ and in which on the rear focal plane of lens 40 the $-1$st-order diffracted wave among the red reproduced light component, the $+1$st-order diffracted wave among the green reproduced light component, and the zero-order diffracted wave among the blue reproduced light component are converged at their respective convergence points coincident on the optical axis. FIG. 32 is an example in which on the front focal plane of lens 20 the red point light source is placed at the position $(0, -f_1\lambda_r/P)$, the green point light source at the position $(+f_1\lambda_g/P, 0)$, and the blue point light source at the position $(0,0)$ and in which on the rear focal plane of lens 40 the $-1$st-order diffracted wave among the red reproduced light component, the $+1$st-order diffracted wave among the green reproduced light component, and the zero-order diffracted wave among the blue reproduced light component are converged at their respective convergence points coincident on the optical axis.

The holograms associated with the respective colors, presented on the spatial light modulator 30, are holograms upon normal incidence of the illumination light components of the respective colors to the spatial light modulator 30 and thus there is no need for concern about the incidence angles as described in the first embodiment, thus enabling simple and fast computation.

Next, a specific example of the fourth embodiment will be described. The spatial light modulator 30 used herein was a data projection liquid crystal panel LCX023AL (pixel pitch P=26 μm) available from Sony Corp. The lens 20 was an achromatic lens having the focal length of 150 mm, and the lens 40 an achromatic lens having the focal length of 150 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (−3.75 mm, 0) or at the position (0, −3.75 mm) and the monochromatic light source $11_g$ for emitting green light at the position (+3.06 mm, 0). The aperture diameter of each of the pinholes $12_r$, $12_g$, and $12_b$ was 150 µm. The incidence angle of the red illumination light component to the spatial light modulator 30 was set at +1.43°, and the incidence angle of the green illumination light component to the spatial light modulator 30 at −1.17°. The size of the aperture 51 of the mask 50 was 2.7 mm (W)×1.3 mm (H). The drive frequency of the spatial light modulator 30 was 70 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

In the case where the zero-order diffracted wave of the blue reproduced light component is observed while the higher-order diffracted waves of the other color reproduced light components are observed, as in the present embodiment, the quantity of light of the higher-order diffracted waves is smaller than that of the zero-order diffracted wave. In order to increase the aperture efficiency, it is thus preferable to use as the spatial light modulator 30 a liquid crystal panel with macro lenses mounted for respective pixels. This results in diverging light passing through each pixel and increasing the light quantity of the higher-order diffracted waves. A liquid crystal panel LCX023CMT (pixel pitch P=26 µm) available from Sony Corp. can be used as the liquid crystal panel of this type. The color balance of color 3D images was improved by using this liquid crystal panel and adjusting the magnitude of drive currents supplied to the respective monochromatic light sources $11_r$, $11_g$, and $11_b$.

As described above, the 3D image display apparatus 4 and 3D image display method according to the fourth embodiment are able to provide color display of a clear 3D image even with use of the spatial light modulator 30 of a low resolution, because the incident directions are appropriately set for the respective illumination light components of the three wavelengths incident to the spatial light modulator 30 and the zero-order diffracted wave or higher-order diffracted waves of the reproduced light components of the three wavelengths generated from the spatial light modulator 30 are superimposed on each other in the aperture 51 after the wavefront transformation by the lens 40. In addition, there is no need for the half mirror for superimposing the reproduced light components of the three wavelengths as required in the second conventional technology, nor for the high-speed shutter as required in the third conventional technology, and thus the present embodiment successfully provides the compact and inexpensive 3D image display apparatus.

(Fifth Embodiment)

Figure 35:
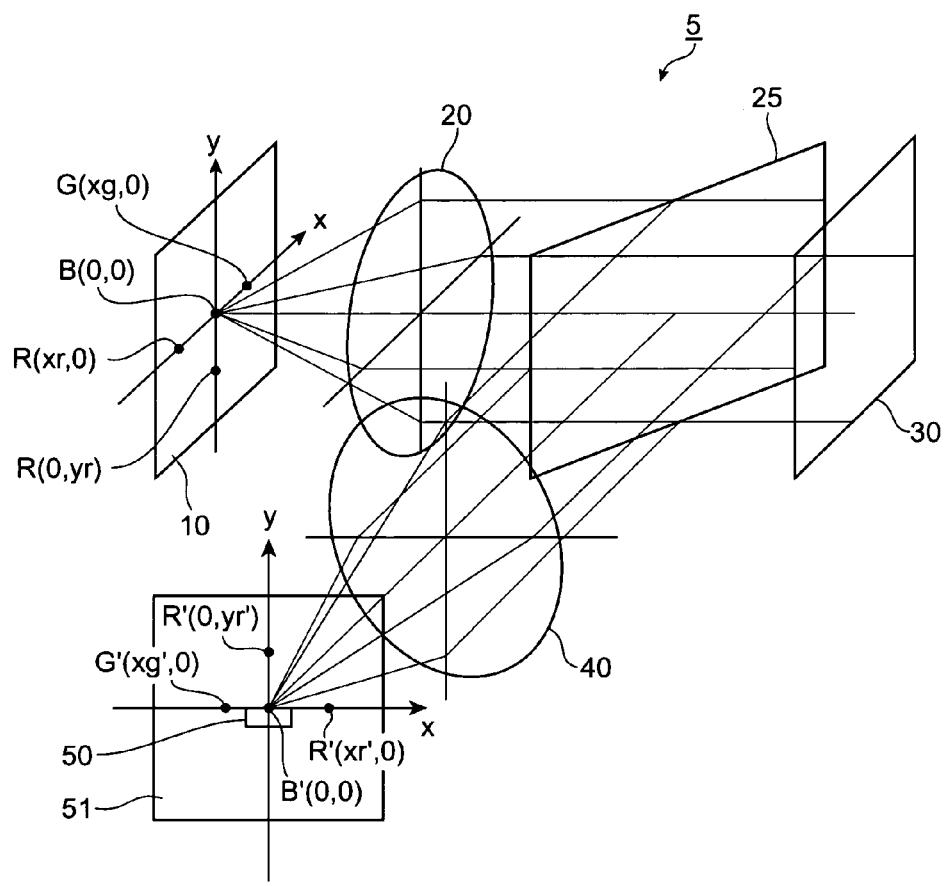
FIG. 35 is an illustration showing a configuration of a fifth embodiment of the 3D image display apparatus according to the present invention.

Next, the fifth embodiment of the 3D image display apparatus and 3D image display method according to the present invention will be described. FIG. 35 is an illustration showing a configuration of the 3D image display apparatus 5 according to the fifth embodiment. The 3D image display apparatus 5 shown in this figure has an illumination light source section 10, a lens 20, a half mirror 25, a reflection type spatial light modulator 30, a lens 40, and a mask 50. The illumination light source section 10, lens 20, and half mirror 25 constitute an illumination optical system for converting each of illumination light components of three wavelengths into a parallel plane wave and making the parallel plane waves incident from mutually different incident directions to the spatial light modulator 30. The half mirror 25 and the lens 40 constitute a reproduced image transforming optical system for subjecting each of reproduced light components of the three wavelengths generated from holograms presented on the spatial light modulator 30, to wavefront transformation into a virtual image or a real image. The illumination optical system and the reproduced image transforming optical system share the half mirror 25.

When compared with the fourth embodiment, the 3D image display apparatus 5 and 3D image display method according to the fifth embodiment are similar thereto in each of the illumination light source section 10, lens 20, lens 40, and mask 50, but are different therefrom in mutual arrangement of the components due to the spatial light modulator 30 being the reflection type spatial light modulator. When compared with the fourth embodiment, the operation of the 3D image display apparatus 5, and the 3D image display method according to the fifth embodiment are different therefrom in that each illumination light component, after converted into a parallel plane wave by the lens 20, passes through the half mirror 25 to enter the spatial light modulator 30, in that the reproduced light components emerge on the same side as the side where the illumination light components are incident to the spatial light modulator 30, and in that each reproduced light component is subjected to the wavefront transformation by the lens 40 after reflected by the half mirror 25. For the rest, the operation of the 3D image display apparatus 5, and the 3D image display method according to the fifth embodiment are theoretically similar to those in the fourth embodiment.

Next, a specific example of the fifth embodiment will be described. The spatial light modulator 30 used herein was a reflection type liquid crystal panel MD800G6 for micro monitor (pixel pitch P=12.55 µm) available from Micro Display Corp. The lens 20 was an achromatic lens having the focal length of 120 mm, and the lens 40 an achromatic lens having the focal length of 60 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (−6.24 mm, 0) or at the position (0, −6.24 mm) and the monochromatic light source $11_g$ for emitting green light at the position (+5.09 mm, 0). The aperture diameter of each of the pinholes $12_r$, $12_g$, and $12_b$ was 150 µm. The incidence angle of the red illumination light component to the spatial light modulator 30 was set at +2.98°, and the incidence angle of the green illumination light component to the spatial light modulator 30 at −2.43°. The size of the aperture 51 of the mask 50 was 2.2 mm (W)×1.1 mm (H). The drive frequency of the spatial light modulator 30 was 90 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

(Sixth Embodiment)

Figure 36:
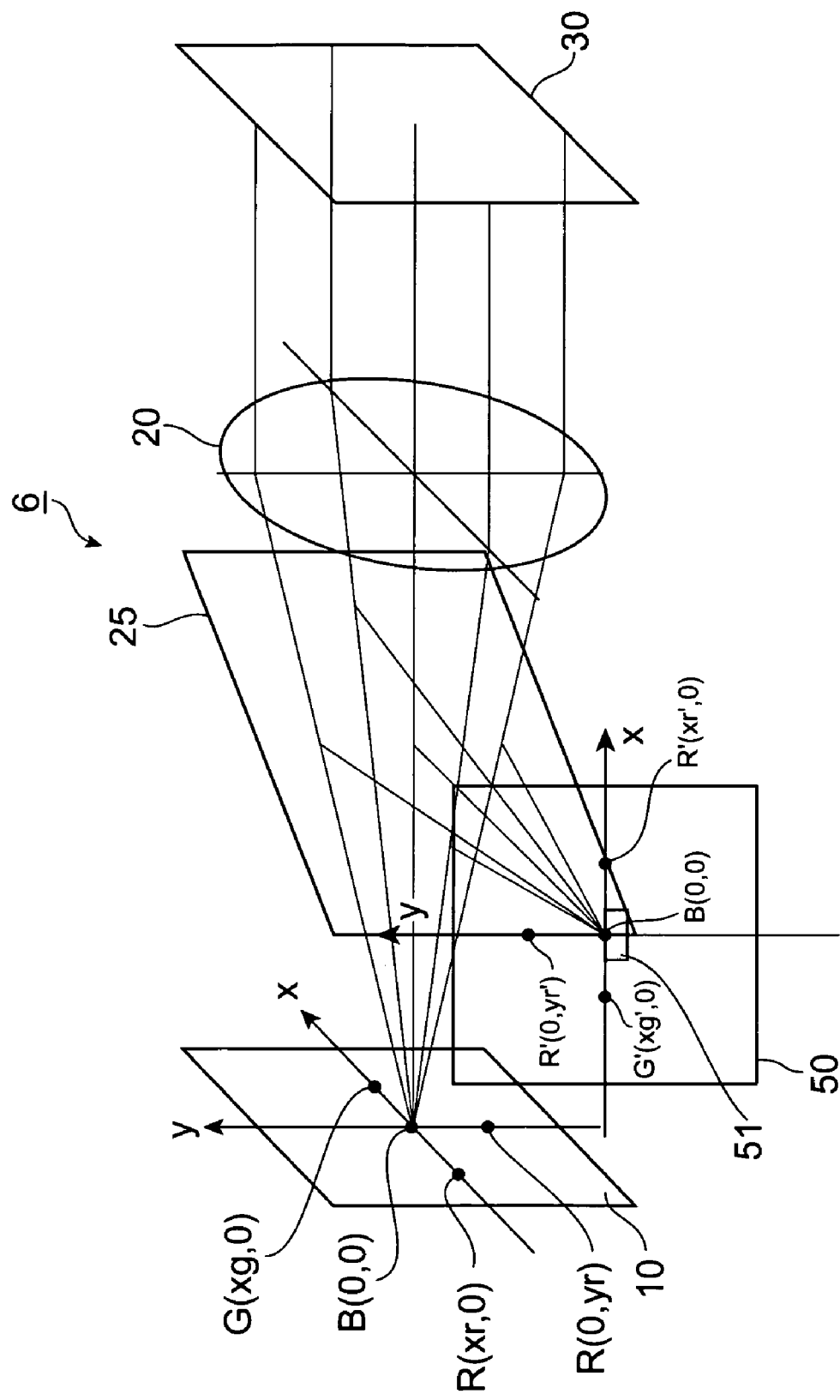
FIG. 36 is an illustration showing a configuration of a sixth embodiment of the 3D image display apparatus according to the present invention.

Next, the sixth embodiment of the 3D image display apparatus and 3D image display method according to the present invention will be described. FIG. 36 is an illustration showing a configuration of the 3D image display apparatus 6 according to the sixth embodiment. The 3D image display apparatus 6 shown in this figure has an illumination light source section 10, a half mirror 25, a lens 20, a reflection type spatial light modulator 30, and a mask 50. The illumination light source section 10, half mirror 25, and lens 20 constitute an illumination optical system for converting each of illumination light components of three wavelengths into a parallel plane wave and making the parallel plane waves incident from mutually different incident directions to the spatial light modulator 30. The lens 20 and the half mirror 25 constitute a reproduced image transforming optical system for subjecting each of reproduced light components of the three wavelengths generated from holograms presented on the spatial light modulator 30, to wavefront transformation into a virtual image or a real image. The illumination optical system and the reproduced image transforming optical system share the lens 20 and the half mirror 25.

When compared with the fourth embodiment, the 3D image display apparatus 6 and 3D image display method according to the sixth embodiment are similar thereto in each of the illumination light source section 10, spatial light modulator 30, and mask 50, but are different therefrom in mutual arrangement of the components because of the spatial light modulator 30 being the reflection type spatial light modulator. When compared with the case of the fourth embodiment, the operation of the 3D image display apparatus 6, and the 3D image display method according to the sixth embodiment are different therefrom in that the lens 20 also acts as the lens 40, in that each illumination light component, after passing through the half mirror 25, is converted into a parallel plane wave by the lens 20 to enter the spatial light modulator 30, in that the reproduced light components emerge on the same side as the side where the illumination light components are incident to the spatial light modulator 30, and in that each reproduced light component is subjected to the wavefront transformation as reflected by the half mirror 25 after passing through the lens 20. For the rest, the operation of the 3D image display apparatus 6, and the 3D image display method according to the sixth embodiment are theoretically almost similar to those in the fourth embodiment.

Next, a specific example of the sixth embodiment will be described. The spatial light modulator 30 used herein was a reflection type liquid crystal panel MD800G6 for micro monitor (pixel pitch P=12.55 μm) available from Micro Display Corp. The lens 20 also acting as the lens 40 was an achromatic lens having the focal length of 60 mm. The monochromatic light source $11_r$ for emitting red light was a light emitting diode CL-280SR-C (wavelength 650 nm; dimensions 1.0 (L)×0.5 (W)×0.6 (H)) available from Citizen Electronics Co., Ltd. The monochromatic light source $11_g$ for emitting green light was a light emitting diode E1S07-AG1A7-02 (wavelength 530 nm; dimensions 1.6 (L)×0.6 (W)×1.15 (H)) available from TOYODA GOSEI Co., Ltd. The monochromatic light source $11_b$ for emitting blue light was a light emitting diode E1S07-AB1A7-02 (wavelength 470 nm; dimensions 1.6 (L)×0.6 (W)×1.15 (H)) available from TOYODA GOSEI Co., Ltd.

The monochromatic light source $11_r$ for emitting red light was placed at the position (−3.02 mm, 0) or at the position (0, −3.02 mm) and the monochromatic light source $11_g$ for emitting green light at the position (+2.54 mm, 0). The aperture diameter of each of the pinholes $12_r$, $12_g$, and $12_b$ was 150 μm. The incidence angle of the red illumination light component to the spatial light modulator 30 was set at +2.98°, and the incidence angle of the green illumination light component to the spatial light modulator 30 at −2.43°. The size of the aperture 51 of the mask 50 was 2.2 mm (W)×1.1 mm (H). The drive frequency of the spatial light modulator 30 was 90 Hz, the holograms associated with the respective colors (wavelengths) were sequentially presented on the spatial light modulator 30, and the three monochromatic light sources $11_r$, $11_g$, and $11_b$ were sequentially activated in synchronism therewith, whereby a full-color 3D image was clearly observed through the aperture 51 of the mask 50.

It is apparent that the present invention can be modified in various ways, from the above description of the present invention. It is noted that such modifications are not to be considered as departing from the spirit and scope of the present invention but all improvements obvious to those skilled in the art are to be included in the scope of claims which will follow.

INDUSTRIAL APPLICABILITY

According to the present invention, the spatial light modulator having the discrete pixel structure presents the holograms associated with the respective wavelengths. The illumination optical system converts each of the illumination light components of the respective wavelengths into a parallel plane wave and makes the parallel plane waves incident from the mutually different incident directions to the spatial light modulator. The reproduced image transforming optical system subjects each of the reproduced images of the wavelengths generated from the holograms presented on the spatial light modulator, to wavefront transformation into a virtual image or a real image. The mask with the aperture is provided on the focal plane of the optical system. Then the illumination optical system sets the incident directions of the respective illumination light components of the wavelengths to the spatial light modulator so that the diffracted waves of any order of the respective reproduced light components of the wavelengths are superimposed on each other in the aperture by the reproduced image transforming optical system. This configuration permits provision of the compact and inexpensive 3D image display apparatus and others capable of providing the color display of the clear 3D image even with use of the spatial light modulator of a low resolution.

The invention claimed is:

1. A 3D image display apparatus for making illumination light components of multiple wavelengths incident to a hologram, thereby generating reproduced light components of the wavelengths from the hologram, and displaying a 3D image based on these reproduced light components, said apparatus comprising:

a spatial light modulator having a discrete pixel structure for presenting holograms associated with the respective wavelengths;

an illumination optical system for converting each of the illumination light components of the wavelengths into a parallel plane wave and making the parallel plane waves incident from mutually different incident directions to said spatial light modulator;

a reproduced image transforming optical system for subjecting each of reproduced images of the wavelengths generated from the holograms presented on said spatial light modulator, to wavefront transformation into a virtual image or a real image; and a mask with an aperture provided on a focal plane of said reproduced image transforming optical system, wherein said illumination optical system sets the incident directions of the respective illumination light components of the wavelengths to said spatial light modulator so that diffracted waves of any order of the respective reproduced light components of the wavelengths are superimposed on each other in said aperture after the wavefront transformation by said reproduced image transforming optical system.

2. A 3D image display apparatus according to claim 1, wherein said illumination optical system comprises a plurality of monochromatic light sources having their respective output wavelengths different from each other; a plurality of pinholes disposed in proximity to said respective monochromatic light sources; and a collimating optical system for collimating light having been emitted from each of said monochromatic light sources and having passed through said pinholes.

3. A 3D image display apparatus according to claim 1, wherein said illumination optical system comprises an achromatic lens having an identical focal length for the light components of the wavelengths.

4. A 3D image display apparatus according to claim 1, wherein said reproduced image transforming optical system comprises an achromatic lens having an identical focal length for the light components of the wavelengths.

5. A 3D image display apparatus according to claim 1, wherein said illumination optical system sets the incident directions of the respective illumination light components of the wavelengths to said spatial light modulator so that zero-order diffracted waves of the respective reproduced light components of the wavelengths are superimposed on each other in said aperture after the wavefront transformation by said reproduced image transforming optical system.

6. A 3D image display apparatus according to claim 1, wherein said illumination optical system sets the incident directions of the respective illumination light components of the wavelengths to said spatial light modulator so that the illumination light component of any one specific wavelength out of the wavelengths is normally incident to said spatial light modulator and so that a zero-order diffracted wave of the reproduced light component of the specific wavelength and a higher-order diffracted wave of the reproduced light component of another wavelength are superimposed on each other in said aperture after the wavefront transformation by said reproduced image transforming optical system.

7. A 3D image display apparatus according to claim 6, wherein, where P represents a pixel pitch of said spatial light modulator, f a focal length of said reproduced image transforming optical system, $n_1$ an order of a diffracted wave of the reproduced light component of the shortest wavelength $\lambda_1$ out of the wavelengths, and $n_i$ an order of a diffracted wave of a reproduced light component of another wavelength $\lambda_i$, an incidence angle $\theta_i$ of the illumination light component of the wavelength $\lambda_i$ to said spatial light modulator is expressed by the following equation:

$\theta_i = \sin^{-1}\{(n_1\lambda_1 - n_i\lambda_i)/P\}$, and wherein said aperture is of a rectangular shape having a length of not more than $\lambda_1 f/P$ on each side.

8. A 3D image display apparatus according to claim 1, wherein said spatial light modulator has a transmission type structure for emitting each of the reproduced light components on the side opposite to the side where the illumination light components are incident.

9. A 3D image display apparatus according to claim 1, wherein said spatial light modulator has a reflection type structure for emitting the reproduced light components on the same side as the side where the illumination light components are incident, and wherein said illumination optical system and said reproduced image transforming optical system share one or more optical components.

10. A 3D image display apparatus according to claim 1, wherein said spatial light modulator has microlenses mounted for respective pixels.

11. A 3D image display method of making illumination light components of multiple wavelengths incident to a hologram, thereby generating reproduced light components of the wavelengths from the hologram, and displaying a 3D image based on these reproduced light components, said method comprising the steps of:

preparing a spatial light modulator having a discrete pixel structure for presenting holograms associated with the respective wavelengths;

letting an illumination optical system convert each of the illumination light components of the wavelengths into a parallel plane wave and letting said illumination optical system make the parallel plane waves incident from mutually different incident directions to said spatial light modulator;

letting a reproduced image transforming optical system subject each of reproduced images of the wavelengths generated from the holograms presented on said spatial light modulator, to wavefront transformation into a virtual image or a real image;

placing a mask with an aperture on a focal plane of said reproduced image transforming optical system; and letting said illumination optical system set the incident directions of the respective illumination light components of the wavelengths to said spatial light modulator so that diffracted waves of any order of the respective reproduced light components of the wavelengths are superimposed on each other in said aperture after the wavefront transformation by said reproduced image transforming optical system.

12. A 3D image display method according to claim 11, wherein said illumination optical system comprises a plurality of monochromatic light sources having their respective output wavelengths different from each other; a plurality of pinholes disposed in proximity to said respective monochromatic light sources; and a collimating optical system for collimating light having been emitted from each of said monochromatic light sources and having passed through said pinholes.

13. A 3D image display method according to claim 11, wherein said illumination optical system comprises an achromatic lens having an identical focal length for the light components of the wavelengths.

14. A 3D image display method according to claim 11, wherein said reproduced image transforming optical system comprises an achromatic lens having an identical focal length for the light components of the wavelengths.

15. A 3D image display method according to claim 11, wherein said illumination optical system sets the incident directions of the respective illumination light components of the wavelengths to said spatial light modulator so that zero-order diffracted waves of the respective reproduced light components of the wavelengths are superimposed on each other in said aperture after the wavefront transformation by said reproduced image transforming optical system.

16. A 3D image display method according to claim 11, wherein said illumination optical system sets the incident directions of the respective illumination light components of the wavelengths incident to said spatial light modulator so that the illumination light component of any one specific wavelength out of the wavelengths is normally incident to said spatial light modulator and so that a zero-order diffracted wave of the reproduced light component of the specific wavelength and a higher-order diffracted wave of the reproduced light component of another wavelength are superimposed on each other in said aperture after the wavefront transformation by said reproduced image transforming optical system.

17. A 3D image display method according to claim 16, wherein, where P represents a pixel pitch of said spatial light modulator, f a focal length of said reproduced image transforming optical system, $n_1$ an order of a diffracted wave of the reproduced light component of the shortest wavelength $\lambda_1$ out of the wavelengths, and $n_i$ an order of a diffracted wave of a reproduced light component of another wavelength $\lambda_i$, an incidence angle $\theta_i$ of the illumination light component of the wavelength $\lambda_i$ to said spatial light modulator is expressed by the following equation:

$$\theta_i = \sin^{-1}\{(n_1\lambda_1 - n_i\lambda_i)/P\}, \text{ and}$$

wherein said aperture is of a rectangular shape having a length of not more than $\lambda_1 f/P$ on each side.

18. A 3D image display method according to claim 11, wherein said spatial light modulator has a transmission type structure for emitting each of the reproduced light components on the side opposite to the side where the illumination light components are incident.

19. A 3D image display method according to claim 11, wherein said spatial light modulator has a reflection type structure for emitting the reproduced light components on the same side as the side where the illumination light components are incident, and wherein said illumination optical system and said reproduced image transforming optical system share one or more optical components.

20. A 3D image display method according to claim 11, wherein said spatial light modulator has microlenses mounted for respective pixels.

* * * * *